(12) United States Patent
Salvia et al.

(10) Patent No.: US 10,452,887 B2
(45) Date of Patent: Oct. 22, 2019

(54) OPERATING A FINGERPRINT SENSOR COMPRISED OF ULTRASONIC TRANSDUCERS

(71) Applicant: InvenSense, Inc., San Jose, CA (US)

(72) Inventors: James Christian Salvia, San Jose, CA (US); Hao-Yen Tang, San Jose, CA (US); Michael H. Perrott, Nashua, NH (US); Bruno W. Garlepp, San Jose, CA (US); Etienne De Foras, Saint Nazaire les Eymes (FR)

(73) Assignee: InvenSense, Inc., San Jose, CA (US)

( * ) Notice: Subject to any disclaimer, the term of this patent is extended or adjusted under 35 U.S.C. 154(b) by 305 days.

(21) Appl. No.: 15/354,876

(22) Filed: Nov. 17, 2016

(65) Prior Publication Data

US 2017/0330012 A1 Nov. 16, 2017

Related U.S. Application Data

(60) Provisional application No. 62/334,392, filed on May 10, 2016.

(51) Int. Cl.
*G06K 9/00* (2006.01)
*G06F 1/3231* (2019.01)
(Continued)

(52) U.S. Cl.
CPC ......... *G06K 9/0002* (2013.01); *G06F 1/3231* (2013.01); *G06F 1/3287* (2013.01); *G06F 3/0436* (2013.01); *G06K 9/00067* (2013.01)

(58) Field of Classification Search
CPC .............. G06K 9/0002; G06K 9/00067; G06F 3/0436; G06F 1/3231; G06F 1/3287
See application file for complete search history.

(56) References Cited

U.S. PATENT DOCUMENTS

| 5,575,286 A | 11/1996 | Weng et al. |
| 5,684,243 A | 11/1997 | Gururaja et al. |

(Continued)

FOREIGN PATENT DOCUMENTS

| EP | 1214909 A1 | 6/2002 |
| EP | 2884301 A1 | 6/2015 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Wesley J Tucker

(57) ABSTRACT

In a method for operating a fingerprint sensor comprising a plurality of ultrasonic transducers, a first subset of ultrasonic transducers of the fingerprint sensor are activated, the first subset of ultrasonic transducers for detecting interaction between an object and the fingerprint sensor. Subsequent to detecting interaction between an object and the fingerprint sensor, a second subset of ultrasonic transducers of the fingerprint sensor are activated, the second subset of ultrasonic transducers for determining whether the object is a human finger, wherein the second subset of ultrasonic transducers comprises a greater number of ultrasonic transducers than the first subset of ultrasonic transducers.

23 Claims, 18 Drawing Sheets

(51) Int. Cl.
  *G06F 1/3287* (2019.01)
  *G06F 3/043* (2006.01)

(56) References Cited

U.S. PATENT DOCUMENTS

| | | | |
|---|---|---|---|
| 5,808,967 A | 9/1998 | Yu et al. | |
| 5,867,302 A | 2/1999 | Fleming | |
| 6,071,239 A | 6/2000 | Cribbs et al. | |
| 6,289,112 B1* | 9/2001 | Jain | G06K 9/00067 382/116 |
| 6,350,652 B1 | 2/2002 | Libera et al. | |
| 6,428,477 B1 | 8/2002 | Mason | |
| 6,500,120 B1 | 12/2002 | Anthony | |
| 6,676,602 B1 | 1/2004 | Barnes et al. | |
| 6,736,779 B1 | 5/2004 | Sano et al. | |
| 7,067,962 B2 | 6/2006 | Scott | |
| 7,109,642 B2 | 9/2006 | Scott | |
| 7,243,547 B2 | 7/2007 | Cobianu et al. | |
| 7,400,750 B2 | 7/2008 | Nam | |
| 7,459,836 B2 | 12/2008 | Scott | |
| 7,471,034 B2 | 12/2008 | Schlote-Holubek et al. | |
| 7,489,066 B2 | 2/2009 | Scott et al. | |
| 7,739,912 B2 | 6/2010 | Schneider et al. | |
| 8,018,010 B2 | 9/2011 | Tigli et al. | |
| 8,139,827 B2 | 3/2012 | Schneider et al. | |
| 8,311,514 B2 | 11/2012 | Bandyopadhyay et al. | |
| 8,335,356 B2 | 12/2012 | Schmitt | |
| 8,433,110 B2 | 4/2013 | Kropp et al. | |
| 8,508,103 B2 | 8/2013 | Schmitt et al. | |
| 8,515,135 B2 | 8/2013 | Clarke et al. | |
| 8,666,126 B2 | 3/2014 | Lee et al. | |
| 8,703,040 B2 | 4/2014 | Liufu et al. | |
| 8,723,399 B2 | 5/2014 | Sammoura et al. | |
| 8,805,031 B2 | 8/2014 | Schmitt | |
| 9,056,082 B2 | 6/2015 | Liautaud et al. | |
| 9,070,861 B2 | 6/2015 | Bibl et al. | |
| 9,224,030 B2 | 12/2015 | Du et al. | |
| 9,245,165 B2 | 1/2016 | Slaby et al. | |
| 9,424,456 B1 | 8/2016 | Kamath Koteshwara et al. | |
| 9,572,549 B2 | 2/2017 | Belevich et al. | |
| 9,582,102 B2 | 2/2017 | Setlak | |
| 9,607,203 B1 | 3/2017 | Yazdandoost et al. | |
| 9,607,206 B2 | 3/2017 | Schmitt et al. | |
| 9,613,246 B1 | 4/2017 | Gozzini et al. | |
| 9,665,763 B2 | 5/2017 | Du et al. | |
| 9,747,488 B2 | 8/2017 | Yazdandoost et al. | |
| 9,785,819 B1 | 10/2017 | Oreifej | |
| 9,815,087 B2 | 11/2017 | Ganti et al. | |
| 9,817,108 B2 | 11/2017 | Kuo et al. | |
| 9,818,020 B2 | 11/2017 | Schuckers et al. | |
| 9,881,195 B2 | 1/2018 | Lee et al. | |
| 9,881,198 B2 | 1/2018 | Lee et al. | |
| 9,898,640 B2 | 2/2018 | Ghavanini | |
| 9,904,836 B2* | 2/2018 | Yeke Yazdandoost | G06K 9/0002 |
| 9,909,225 B2 | 3/2018 | Lee et al. | |
| 9,922,235 B2 | 3/2018 | Cho et al. | |
| 9,934,371 B2 | 4/2018 | Hong et al. | |
| 9,939,972 B2 | 4/2018 | Shepelev et al. | |
| 9,953,205 B1 | 4/2018 | Rasmussen et al. | |
| 9,959,444 B2 | 5/2018 | Young et al. | |
| 9,967,100 B2 | 5/2018 | Hong et al. | |
| 9,983,656 B2 | 5/2018 | Merrell et al. | |
| 9,984,271 B1* | 5/2018 | King | G06K 9/0002 |
| 10,275,638 B1* | 4/2019 | Yousefpor | G06K 9/0002 |
| 10,315,222 B2 | 6/2019 | Salvia et al. | |
| 2002/0135273 A1 | 9/2002 | Mauchamp et al. | |
| 2003/0013955 A1 | 1/2003 | Poland | |
| 2004/0085858 A1 | 5/2004 | Khuri-Yakub et al. | |
| 2004/0122316 A1 | 6/2004 | Satoh et al. | |
| 2004/0174773 A1 | 9/2004 | Thomenius et al. | |
| 2005/0057284 A1 | 3/2005 | Wodnicki | |
| 2005/0110071 A1 | 5/2005 | Ema et al. | |
| 2005/0146240 A1 | 7/2005 | Smith et al. | |
| 2005/0148132 A1 | 7/2005 | Wodnicki et al. | |
| 2005/0162040 A1 | 7/2005 | Robert | |
| 2006/0052697 A1 | 3/2006 | Hossack et al. | |
| 2006/0079777 A1 | 4/2006 | Karasawa | |
| 2007/0046396 A1 | 3/2007 | Huang | |
| 2007/0073135 A1 | 3/2007 | Lee et al. | |
| 2007/0202252 A1 | 8/2007 | Sasaki | |
| 2007/0215964 A1 | 9/2007 | Khuri-Yakub et al. | |
| 2007/0230754 A1 | 10/2007 | Jain et al. | |
| 2008/0125660 A1 | 5/2008 | Yao et al. | |
| 2008/0150032 A1 | 6/2008 | Tanaka | |
| 2008/0194053 A1 | 8/2008 | Huang | |
| 2009/0005684 A1 | 1/2009 | Kristoffersen et al. | |
| 2009/0182237 A1 | 7/2009 | Angelsen et al. | |
| 2009/0274343 A1 | 11/2009 | Clarke | |
| 2009/0303838 A1 | 12/2009 | Svet | |
| 2010/0030076 A1 | 2/2010 | Vortman et al. | |
| 2010/0168583 A1 | 7/2010 | Dausch et al. | |
| 2010/0195851 A1 | 8/2010 | Buccafusca | |
| 2010/0201222 A1 | 8/2010 | Adachi et al. | |
| 2010/0202254 A1 | 8/2010 | Roest et al. | |
| 2010/0239751 A1 | 9/2010 | Regniere | |
| 2010/0251824 A1 | 10/2010 | Schneider et al. | |
| 2010/0256498 A1 | 10/2010 | Tanaka | |
| 2010/0278008 A1 | 11/2010 | Ammar | |
| 2011/0285244 A1 | 11/2011 | Lewis et al. | |
| 2011/0291207 A1 | 12/2011 | Martin et al. | |
| 2012/0016604 A1 | 1/2012 | Irving et al. | |
| 2012/0092026 A1 | 4/2012 | Liautaud et al. | |
| 2012/0095347 A1 | 4/2012 | Adam et al. | |
| 2012/0147698 A1 | 6/2012 | Wong et al. | |
| 2012/0232396 A1 | 9/2012 | Tanabe | |
| 2012/0238876 A1 | 9/2012 | Tanabe et al. | |
| 2012/0279865 A1 | 11/2012 | Regniere et al. | |
| 2012/0288641 A1 | 11/2012 | Diatezua et al. | |
| 2013/0051179 A1 | 2/2013 | Hong | |
| 2013/0064043 A1 | 3/2013 | Degertekin et al. | |
| 2013/0127592 A1 | 5/2013 | Fyke et al. | |
| 2013/0133428 A1 | 5/2013 | Lee et al. | |
| 2013/0201134 A1 | 8/2013 | Schneider et al. | |
| 2013/0294202 A1 | 11/2013 | Hajati | |
| 2014/0060196 A1 | 3/2014 | Falter et al. | |
| 2014/0117812 A1 | 5/2014 | Hajati | |
| 2014/0176332 A1 | 6/2014 | Alameh et al. | |
| 2014/0208853 A1 | 7/2014 | Onishi et al. | |
| 2014/0219521 A1 | 8/2014 | Schmitt et al. | |
| 2014/0232241 A1 | 8/2014 | Hajati | |
| 2014/0265721 A1 | 9/2014 | Robinson et al. | |
| 2014/0355387 A1 | 12/2014 | Kitchens et al. | |
| 2015/0036065 A1 | 2/2015 | Yousefpor et al. | |
| 2015/0087991 A1 | 3/2015 | Chen et al. | |
| 2015/0097468 A1 | 4/2015 | Hajati et al. | |
| 2015/0145374 A1 | 5/2015 | Xu et al. | |
| 2015/0164473 A1 | 6/2015 | Kim et al. | |
| 2015/0165479 A1 | 6/2015 | Lasiter et al. | |
| 2015/0169136 A1 | 6/2015 | Ganti et al. | |
| 2015/0189136 A1 | 7/2015 | Chung et al. | |
| 2015/0198699 A1 | 7/2015 | Kuo et al. | |
| 2015/0206738 A1 | 7/2015 | Rastegar | |
| 2015/0213180 A1 | 7/2015 | Herberholz | |
| 2015/0220767 A1 | 8/2015 | Yoon et al. | |
| 2015/0261261 A1 | 9/2015 | Bhagavatula et al. | |
| 2015/0286312 A1 | 10/2015 | Kang et al. | |
| 2015/0345987 A1 | 12/2015 | Hajati | |
| 2016/0051225 A1 | 2/2016 | Kim et al. | |
| 2016/0063294 A1* | 3/2016 | Du | G06K 9/0002 382/124 |
| 2016/0086010 A1* | 3/2016 | Merrell | G06K 9/0002 382/124 |
| 2016/0092716 A1* | 3/2016 | Yazdandoost | G06K 9/0002 382/124 |
| 2016/0100822 A1 | 4/2016 | Kim et al. | |
| 2016/0107194 A1* | 4/2016 | Panchawagh | G06F 3/043 367/140 |
| 2016/0326477 A1 | 11/2016 | Fernandez-Alcon et al. | |
| 2017/0330552 A1 | 1/2017 | Garlepp et al. | |
| 2017/0075700 A1 | 3/2017 | Abudi et al. | |
| 2017/0100091 A1 | 4/2017 | Eigil et al. | |
| 2017/0110504 A1 | 4/2017 | Panchawagh et al. | |
| 2017/0119343 A1 | 5/2017 | Pintoffl | |

(56) References Cited

U.S. PATENT DOCUMENTS

| | | | |
|---|---|---|---|
| 2017/0168543 A1* | 6/2017 | Dai | G06F 1/3206 |
| 2017/0219536 A1 | 8/2017 | Koch et al. | |
| 2017/0231534 A1 | 8/2017 | Agassy et al. | |
| 2017/0293791 A1 | 10/2017 | Mainguet et al. | |
| 2017/0322290 A1 | 11/2017 | Ng | |
| 2017/0322291 A1 | 11/2017 | Salvia et al. | |
| 2017/0322292 A1 | 11/2017 | Salvia et al. | |
| 2017/0322305 A1 | 11/2017 | Apte et al. | |
| 2017/0323133 A1 | 11/2017 | Tsai | |
| 2017/0326590 A1 | 11/2017 | Daneman | |
| 2017/0326591 A1 | 11/2017 | Apte et al. | |
| 2017/0326593 A1 | 11/2017 | Garlepp et al. | |
| 2017/0326594 A1 | 11/2017 | Berger et al. | |
| 2017/0328866 A1 | 11/2017 | Apte et al. | |
| 2017/0328870 A1 | 11/2017 | Garlepp et al. | |
| 2017/0330553 A1 | 11/2017 | Garlepp et al. | |
| 2017/0357839 A1* | 12/2017 | Yazdandoost | G06K 9/0002 |
| 2018/0206820 A1 | 7/2018 | Anand et al. | |
| 2018/0349663 A1* | 12/2018 | Garlepp | G06K 9/0002 |
| 2018/0357457 A1* | 12/2018 | Rasmussen | G06K 9/00114 |
| 2018/0369866 A1 | 12/2018 | Sammoura et al. | |
| 2019/0005300 A1* | 1/2019 | Garlepp | B06B 1/064 |
| 2019/0102046 A1 | 4/2019 | Miranto et al. | |

FOREIGN PATENT DOCUMENTS

| | | |
|---|---|---|
| JP | 2011040467 A | 2/2011 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2017003848 A1 | 1/2017 |
| WO | 2017192895 A1 | 11/2017 |
| WO | 2017196678 A1 | 11/2017 |
| WO | 2017196682 A1 | 11/2017 |
| WO | 2017192903 A3 | 12/2017 |

OTHER PUBLICATIONS

ISA/EP, International Search Report and Written Opinion for International Application No. PCT/US2017/031120, 12 pages, dated Aug. 29, 2017 (Aug. 29, 2017).

ISA/EP, International Search Report and Written Opinion for International Application No. PCT/US2017/031120, 13 pages, dated Sep. 1, 2017 (Sep. 1, 2017).

ISA/EP, International Search Report and Written Opinion for International Application No. PCT/US2017/031134, 12 pages, dated Aug. 30, 2017 (Aug. 30, 2017).

ISA/EP, International Search Report and Written Opinion for International Application No. PCT/US2017/031421 13 pages, dated Jun. 21, 2017 (Jun. 21, 2017).

ISA/EP, International Search Report and Written Opinion for International Application No. PCT/US2017/031426 13 pages, dated Jun. 22, 2017 (Jun. 22, 2017).

ISA/EP, International Search Report and Written Opinion for International Application No. PCT/US2017/031431, 14 pages, dated Aug. 1, 2017 (Aug. 1, 2017).

ISA/EP, International Search Report and Written Opinion for International Application No. PCT/US2017/031434, 13 pages, dated Jun. 26, 2017 (Jun. 26, 2017).

ISA/EP, International Search Report and Written Opinion for International Application No. PCT/US2017/031439, 10 pages, dated Jun. 20, 2017 (Jun. 20, 2017).

ISA/EP, International Search Report and Written Opinion for International Application No. PCT/US2017/031824, 18 pages, dated Sep. 22, 2017 (Sep. 22, 2017).

ISA/EP, International Search Report and Written Opinion for International Application No. PCT/US2017/031827, 16 pages, dated Aug. 1, 2017 (Aug. 1, 2017).

ISA/EP, International Search Report and Written Opinion for International Application No. PCT/US2017/031831, 12 pages, dated Jul. 21, 2017 (Jul. 21, 2017).

ISA/EP, Partial International Search Report for International Application No. PCT/US2017/031140, 13 pages, dated Aug. 29, 2017 (Aug. 29, 2017).

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Hopcroft, et al., "Temperature Compensation of a MEMS REsonator Uding Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hoperoft/Publications/Hoperoft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

ISA/EP, International Search Report and Written Opinion for International Application No. PCT/US2017/031140, 18 pages,dated Nov. 2, 2017 (Nov. 2, 2017).

ISA/EP, International Search Report for International Application No. PCT/US2017/031826, 16 pages, dated Feb. 27, 2018 (Feb. 27, 2018).

ISA/EP, Partial International Search Report for International Application No. PCT/US2017/031823, 12 pages, dated Nov. 30, 2017 (Nov. 30, 2017).

ISA/EP, International Search Report and Written Opinion for International Application # PCT/US2018/063431, pp. 1-15, dated Feb. 5, 2019 (Feb. 5, 2019).

"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf [retrieved on Jan. 24, 2019], Aug. 9, 2017, 1-8.

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

"Sleep Mode", Wikipedia, Retrieved from the Internet: URL:https://web.archive.org/web/20170908153323/https://en.wikipedia.org/Wiki/Sleep_mode [retrieved on Jan. 25, 2019], Sep. 8, 2017, 1-3.

(56) References Cited

OTHER PUBLICATIONS

"TMS320C5515 Fingerprint Development Kit (FDK) Hardware Guide", Texas Instruments, Literature No. SPRUFX3, XP055547651, Apr. 2010, 1-26.

"ZTE V7 MAX. 5,5" smartphone on MediaTeck Hello P10 cpu; Published on Apr. 20, 2016; https://www.youtube.com/watch?v=ncNCbpkGQzU (Year: 2016).

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.

Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.

Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.

Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.

Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.

Zhou, et al., "Partial Fingerprint Reconstruction with Improved Smooth Extension", Network and System Security, Springer Berlin Heidelberg, Jun. 3, 2013, 756-762.

\* cited by examiner

- Some pixels are outside mean range so proceed to pattern matching
- Truncated pattern 1100000111 matches pattern x11x00x11x
- Ridge/valley detected in this group

OPERATING A FINGERPRINT SENSOR COMPRISED OF ULTRASONIC TRANSDUCERS

RELATED APPLICATIONS

This application claims also priority to and the benefit of U.S. Provisional Patent Application 62/334,392, filed on May 10, 2016, entitled "ALWAYS-ON SENSOR DEVICE FOR HUMAN TOUCH," by Salvia, having Attorney Docket No. IVS-684.PR, and assigned to the assignee of the present application, which is incorporated herein by reference in its entirety.

BACKGROUND

Conventional fingerprint sensing solutions are available and deployed in consumer products, such as smartphones and other type of mobile devices. Common fingerprint sensor technologies generally rely on (1) a sensor and (2) a processing element. When the sensor is turned on, the sensor can take or can direct the device to take an image, which is digitized (e.g., level of brightness is encoded into a digital format), and send the image to the processing element. However, finger print sensors typically consume substantial amount of power (e.g., hundreds of μWatts to several mWatts) and, therefore, may present a considerable drain on power resources of the mobile device by rapidly draining the battery of the mobile device.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 16 illustrates an example phase delay pattern for a 9×9 ultrasonic transducer block, according to some embodiments.

FIG. 17 illustrates another example phase delay pattern for a 9×9 ultrasonic transducer block, according to some embodiments.

DESCRIPTION OF EMBODIMENTS

Figure 1:
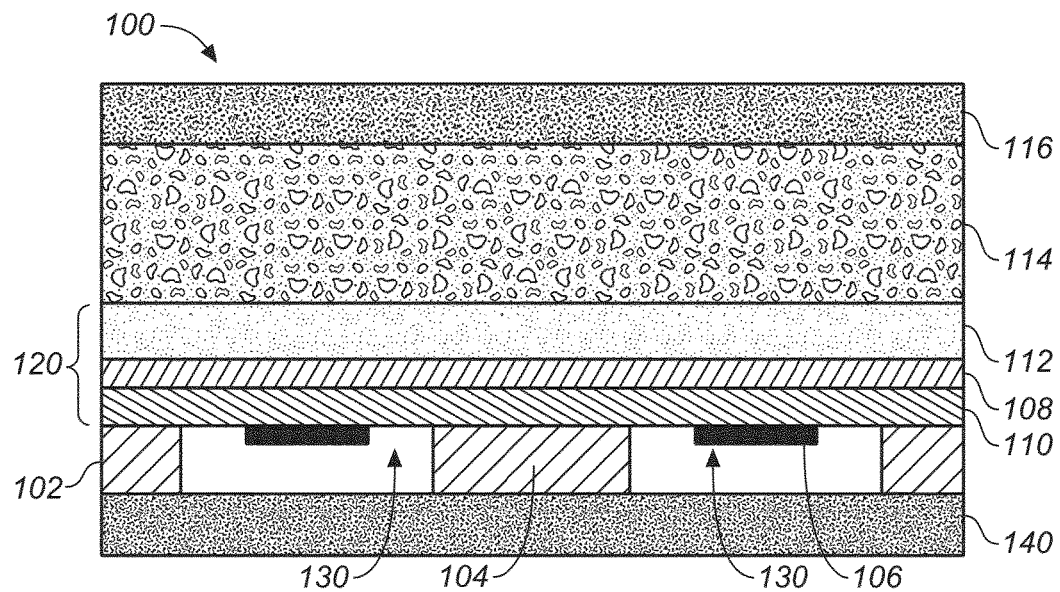
FIG. 1 is a diagram illustrating a PMUT device having a center pinned membrane, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "activating," "detecting," "determining," "capturing," "sensing," "generating," "imaging," "performing," "comparing," "updating," "transmitting," "entering," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example piezoelectric micromachined ultrasonic transducer (PMUT), in accordance with various embodiments. Example arrays including PMUT devices are then described. Example operations of example arrays of ultrasonic transducers (e.g., PMUT devices) are then further described, including the use of multiple PMUT devices to form a beam for capturing a pixel. Examples of a fingerprint sensor, and operations pertaining to the use of a fingerprint sensor, are then described.

Embodiments described herein relate to a method of operating a two-dimensional array of ultrasonic transducers. When an ultrasonic transducer, such as a PMUT device, transmits an ultrasonic signal, the ultrasonic signal typically does not transmit as a straight line. Rather, the ultrasonic signal will transmit to a wider area. For instance, when traveling through a transmission medium, the ultrasonic signal will diffract, thus transmitting to a wide area.

Embodiments described herein provide fingerprint sensing system including an array of ultrasonic transducers for sensing the fingerprint. In order to accurately sense a fingerprint, it is desirable to sense a high resolution image of the fingerprint. Using multiple ultrasonic transducers, some of which are time delayed with respect to other ultrasonic transducers, embodiments described herein provide for focusing a transmit beam (e.g., forming a beam) of an ultrasonic signal to a desired point, allowing for high resolution sensing of a fingerprint, or other object. For instance, transmitting an ultrasonic signal from multiple PMUTs, where some PMUTs transmit at a time delay relative to other PMUTs, provides for focusing the ultrasonic beam to a contact point of a fingerprint sensing system (e.g., a top of a platen layer) for sensing a high resolution image of a pixel associated with the transmitting PMUTs.

Embodiments described herein further provide for the implementation of a finger detection mode for use with a fingerprint sensor operating within an electronic device. In one embodiment, the fingerprint sensor includes an array of PMUT devices. The finger detection mode is operable to identify if a finger interacts with a fingerprint sensor and allows for the fingerprint sensor to operate in an always-on state, while reducing power consumption of the fingerprint sensor. In the described embodiments, the finger detection mode can operate in one or more phases to detect whether a finger has interacted with a fingerprint sensor. If it is determined that a finger has interacted with the fingerprint sensor, the fingerprint sensor may be fully powered on to capture a full image of the fingerprint for further processing. Alternatively, if it is determined that something other than a finger has interacted with the fingerprint sensor, the fingerprint sensor may remain in a low power finger detection mode (e.g., always-on state).

Piezoelectric Micromachined Ultrasonic Transducer (PMUT)

Systems and methods disclosed herein, in one or more aspects provide efficient structures for an acoustic transducer (e.g., a piezoelectric micromachined actuated transducer or PMUT). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the word "example" is used herein to mean serving as an example, instance, or illustration.

FIG. 1 is a diagram illustrating a PMUT device 100 having a center pinned membrane, according to some embodiments. PMUT device 100 includes an interior pinned membrane 120 positioned over a substrate 140 to define a cavity 130. In one embodiment, membrane 120 is attached both to a surrounding edge support 102 and interior support 104. In one embodiment, edge support 102 is connected to an electric potential. Edge support 102 and interior support 104 may be made of electrically conducting materials, such as and without limitation, aluminum, molybdenum, or titanium. Edge support 102 and interior support 104 may also be made of dielectric materials, such as silicon dioxide, silicon nitride or aluminum oxide that have electrical connections on the sides or in vias through edge support 102 or interior support 104, electrically coupling lower electrode 106 to electrical wiring in substrate 140.

In one embodiment, both edge support 102 and interior support 104 are attached to a substrate 140. In various embodiments, substrate 140 may include at least one of, and without limitation, silicon or silicon nitride. It should be appreciated that substrate 140 may include electrical wirings and connection, such as aluminum or copper. In one embodiment, substrate 140 includes a CMOS logic wafer bonded to edge support 102 and interior support 104. In one embodiment, the membrane 120 comprises multiple layers. In an example embodiment, the membrane 120 includes lower electrode 106, piezoelectric layer 110, and upper electrode 108, where lower electrode 106 and upper electrode 108 are coupled to opposing sides of piezoelectric layer 110. As shown, lower electrode 106 is coupled to a lower surface of piezoelectric layer 110 and upper electrode 108 is coupled to an upper surface of piezoelectric layer 110. It should be appreciated that, in various embodiments, PMUT device 100 is a microelectromechanical (MEMS) device.

In one embodiment, membrane 120 also includes a mechanical support layer 112 (e.g., stiffening layer) to mechanically stiffen the layers. In various embodiments, mechanical support layer 112 may include at least one of, and without limitation, silicon, silicon oxide, silicon nitride, aluminum, molybdenum, titanium, etc. In one embodiment, PMUT device 100 also includes an acoustic coupling layer 114 above membrane 120 for supporting transmission of acoustic signals. It should be appreciated that acoustic coupling layer can include air, liquid, gel-like materials, epoxy, or other materials for supporting transmission of acoustic signals. In one embodiment, PMUT device 100 also includes platen layer 116 above acoustic coupling layer 114 for containing acoustic coupling layer 114 and providing a contact surface for a finger or other sensed object with PMUT device 100. It should be appreciated that, in various embodiments, acoustic coupling layer 114 provides a contact surface, such that platen layer 116 is optional. Moreover, it should be appreciated that acoustic coupling layer 114 and/or platen layer 116 may be included with or used in conjunction with multiple PMUT devices. For example, an array of PMUT devices may be coupled with a single acoustic coupling layer 114 and/or platen layer 116.

Figure 2:
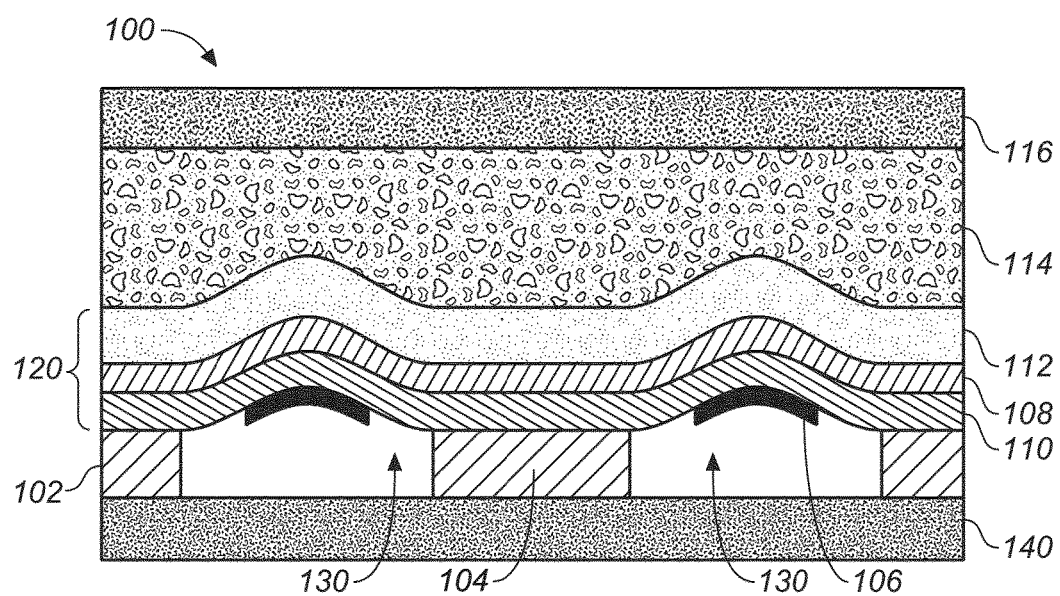
FIG. 2 is a diagram illustrating an example of membrane movement during activation of a PMUT device, according to some embodiments.

FIG. 2 is a diagram illustrating an example of membrane movement during activation of PMUT device 100, according to some embodiments. As illustrated with respect to FIG. 2, in operation, responsive to an object proximate platen layer 116, the electrodes 106 and 108 deliver a high frequency electric charge to the piezoelectric layer 110, causing those portions of the membrane 120 not pinned to the surrounding edge support 102 or interior support 104 to be displaced upward into the acoustic coupling layer 114. This generates a pressure wave that can be used for signal probing of the object. Return echoes can be detected as pressure waves causing movement of the membrane, with compression of the piezoelectric material in the membrane causing an electrical signal proportional to amplitude of the pressure wave.

The described PMUT device 100 can be used with almost any electrical device that converts a pressure wave into mechanical vibrations and/or electrical signals. In one aspect, the PMUT device 100 can comprise an acoustic sensing element (e.g., a piezoelectric element) that generates and senses ultrasonic sound waves. An object in a path of the generated sound waves can create a disturbance (e.g., changes in frequency or phase, reflection signal, echoes, etc.) that can then be sensed. The interference can be analyzed to determine physical parameters such as (but not limited to) distance, density and/or speed of the object. As an example, the PMUT device 100 can be utilized in various applications, such as, but not limited to, fingerprint or physiologic sensors suitable for wireless devices, industrial systems, automotive systems, robotics, telecommunications, security, medical devices, etc. For example, the PMUT device 100 can be part of a sensor array comprising a plurality of ultrasonic transducers deposited on a wafer, along with various logic, control and communication electronics. A sensor array may comprise homogenous or identical PMUT devices 100, or a number of different or heterogonous device structures.

In various embodiments, the PMUT device 100 employs a piezoelectric layer 110, comprised of materials such as, but not limited to, Aluminum nitride (AlN), lead zirconate titanate (PZT), quartz, polyvinylidene fluoride (PVDF), and/or zinc oxide, to facilitate both acoustic signal production and sensing. The piezoelectric layer 110 can generate electric charges under mechanical stress and conversely experience a mechanical strain in the presence of an electric field. For example, the piezoelectric layer 110 can sense mechanical vibrations caused by an ultrasonic signal and produce an electrical charge at the frequency (e.g., ultrasonic frequency) of the vibrations. Additionally, the piezoelectric layer 110 can generate an ultrasonic wave by vibrating in an oscillatory fashion that might be at the same frequency (e.g., ultrasonic frequency) as an input current generated by an alternating current (AC) voltage applied across the piezoelectric layer 110. It should be appreciated that the piezoelectric layer 110 can include almost any material (or combination of materials) that exhibits piezoelectric properties, such that the structure of the material does not have a center of symmetry and a tensile or compressive stress applied to the material alters the separation between positive and negative charge sites in a cell causing a polarization at the surface of the material. The polarization is directly proportional to the applied stress and is direction dependent so that compressive and tensile stresses results in electric fields of opposite polarizations.

Figure 10:
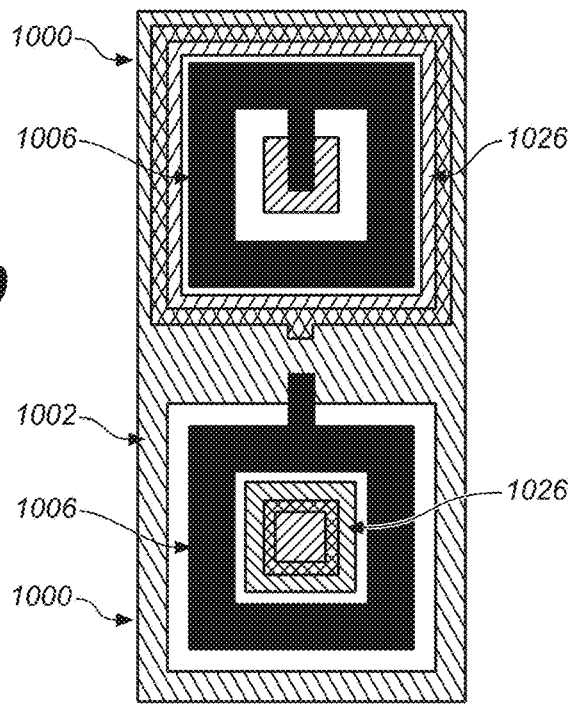
FIG. 10 illustrates an example pair of PMUT devices in a PMUT array, with each PMUT having differing electrode patterning, according to some embodiments.

Further, the PMUT device 100 comprises electrodes 106 and 108 that supply and/or collect the electrical charge to/from the piezoelectric layer 110. It should be appreciated that electrodes 106 and 108 can be continuous and/or patterned electrodes (e.g., in a continuous layer and/or a patterned layer). For example, as illustrated, electrode 106 is a patterned electrode and electrode 108 is a continuous electrode. As an example, electrodes 106 and 108 can be comprised of almost any metal layers, such as, but not limited to, Aluminum (Al)/Titanium (Ti), Molybdenum (Mo), etc., which are coupled with and on opposing sides of the piezoelectric layer 110. In one embodiment, PMUT device also includes a third electrode, as illustrated in FIG. 10 and described below.

According to an embodiment, the acoustic impedance of acoustic coupling layer 114 is selected to be similar to the acoustic impedance of the platen layer 116, such that the acoustic wave is efficiently propagated to/from the membrane 120 through acoustic coupling layer 114 and platen layer 116. As an example, the platen layer 116 can comprise various materials having an acoustic impedance in the range between 0.8 to 4 MRayl, such as, but not limited to, plastic, resin, rubber, Teflon, epoxy, etc. In another example, the platen layer 116 can comprise various materials having a high acoustic impedance (e.g., an acoustic impendence greater than 10 MRayl), such as, but not limited to, glass, aluminum-based alloys, sapphire, etc. Typically, the platen layer 116 can be selected based on an application of the sensor. For instance, in fingerprinting applications, platen layer 116 can have an acoustic impedance that matches (e.g., exactly or approximately) the acoustic impedance of human skin (e.g., $1.6 \times 10^6$ Rayl). Further, in one aspect, the platen layer 116 can further include a thin layer of anti-scratch material. In various embodiments, the anti-scratch layer of the platen layer 116 is less than the wavelength of the acoustic wave that is to be generated and/or sensed to provide minimum interference during propagation of the acoustic wave. As an example, the anti-scratch layer can comprise various hard and scratch-resistant materials (e.g., having a Mohs hardness of over 7 on the Mohs scale), such as, but not limited to sapphire, glass, MN, Titanium nitride (TiN), Silicon carbide (SiC), diamond, etc. As an example, PMUT device 100 can operate at 20 MHz and accordingly, the wavelength of the acoustic wave propagating through the acoustic coupling layer 114 and platen layer 116 can be 70-150 microns. In this example scenario, insertion loss can be reduced and acoustic wave propagation efficiency can be improved by utilizing an anti-scratch layer having a thickness of 1 micron and the platen layer 116 as a whole having a thickness of 1-2 millimeters. It is noted that the term "anti-scratch material" as used herein relates to a material that is resistant to scratches and/or scratch-proof and provides substantial protection against scratch marks.

In accordance with various embodiments, the PMUT device 100 can include metal layers (e.g., Aluminum (Al)/Titanium (Ti), Molybdenum (Mo), etc.) patterned to form electrode 106 in particular shapes (e.g., ring, circle, square, octagon, hexagon, etc.) that are defined in-plane with the membrane 120. Electrodes can be placed at a maximum strain area of the membrane 120 or placed at close to either or both the surrounding edge support 102 and interior support 104. Furthermore, in one example, electrode 108 can be formed as a continuous layer providing a ground plane in contact with mechanical support layer 112, which can be formed from silicon or other suitable mechanical stiffening material. In still other embodiments, the electrode 106 can be routed along the interior support 104, advantageously reducing parasitic capacitance as compared to routing along the edge support 102.

For example, when actuation voltage is applied to the electrodes, the membrane 120 will deform and move out of plane. The motion then pushes the acoustic coupling layer 114 it is in contact with and an acoustic (ultrasonic) wave is generated. Oftentimes, vacuum is present inside the cavity 130 and therefore damping contributed from the media within the cavity 130 can be ignored. However, the acoustic coupling layer 114 on the other side of the membrane 120 can substantially change the damping of the PMUT device 100. For example, a quality factor greater than 20 can be observed when the PMUT device 100 is operating in air with atmosphere pressure (e.g., acoustic coupling layer 114 is air) and can decrease lower than 2 if the PMUT device 100 is operating in water (e.g., acoustic coupling layer 114 is water).

Figure 3:
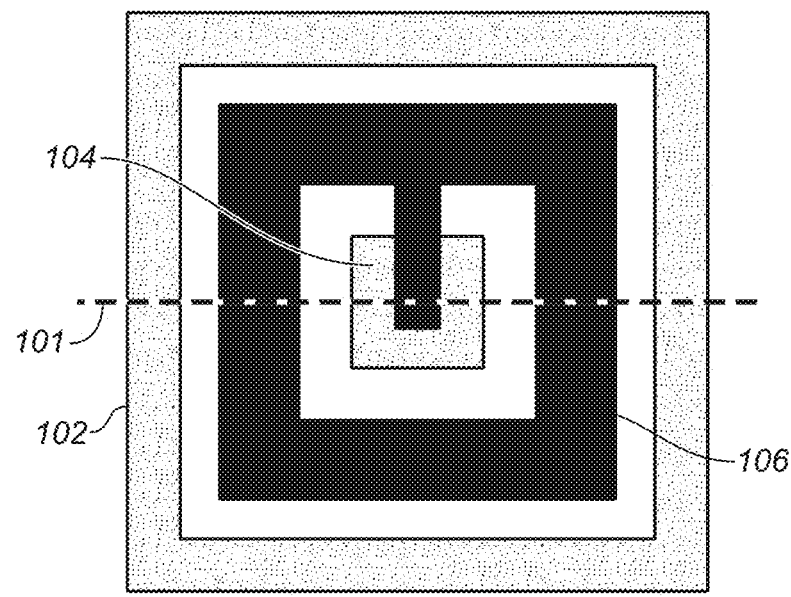
FIG. 3 is a top view of the PMUT device of FIG. 1, according to some embodiments.

FIG. 3 is a top view of the PMUT device 100 of FIG. 1 having a substantially square shape, which corresponds in part to a cross section along dotted line 101 in FIG. 3. Layout of surrounding edge support 102, interior support 104, and lower electrode 106 are illustrated, with other continuous layers not shown. It should be appreciated that the term "substantially" in "substantially square shape" is intended to convey that a PMUT device 100 is generally square-shaped, with allowances for variations due to manufacturing processes and tolerances, and that slight deviation from a square shape (e.g., rounded corners, slightly wavering lines, deviations from perfectly orthogonal corners or intersections, etc.) may be present in a manufactured device. While a generally square arrangement PMUT device is shown, alternative embodiments including rectangular, hexagon, octagonal, circular, or elliptical are contemplated. In other embodiments, more complex electrode or PMUT device shapes can be used, including irregular and non-symmetric layouts such as chevrons or pentagons for edge support and electrodes.

Figure 4:
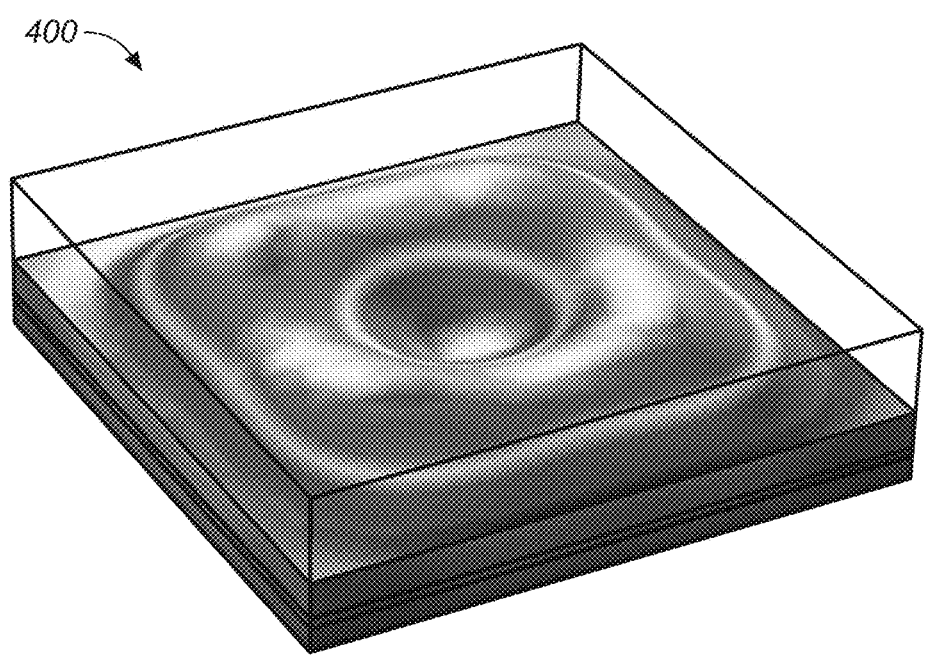
FIG. 4 is a simulated map illustrating maximum vertical displacement of the membrane of the PMUT device shown in FIGS. 1-3, according to some embodiments.

FIG. 4 is a simulated topographic map 400 illustrating maximum vertical displacement of the membrane 120 of the PMUT device 100 shown in FIGS. 1-3. As indicated, maximum displacement generally occurs along a center axis of the lower electrode, with corner regions having the greatest displacement. As with the other figures, FIG. 4 is not drawn to scale with the vertical displacement exaggerated for illustrative purposes, and the maximum vertical displacement is a fraction of the horizontal surface area comprising the PMUT device 100. In an example PMUT device 100, maximum vertical displacement may be measured in nanometers, while surface area of an individual PMUT device 100 may be measured in square microns.

Figure 5:
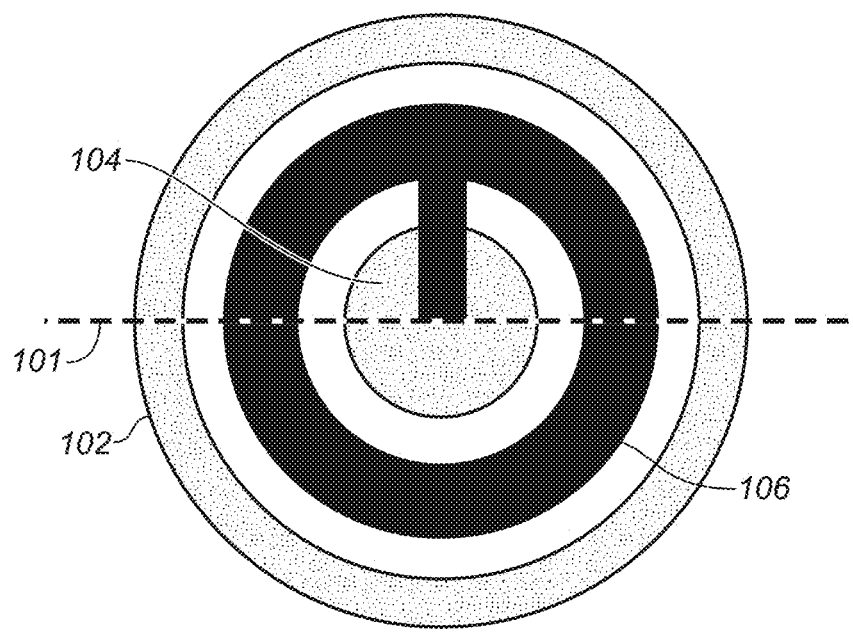
FIG. 5 is a top view of an example PMUT device having a circular shape, according to some embodiments.

FIG. 5 is a top view of another example of the PMUT device 100 of FIG. 1 having a substantially circular shape, which corresponds in part to a cross section along dotted line 101 in FIG. 5. Layout of surrounding edge support 102, interior support 104, and lower electrode 106 are illustrated, with other continuous layers not shown. It should be appreciated that the term "substantially" in "substantially circular shape" is intended to convey that a PMUT device 100 is generally circle-shaped, with allowances for variations due to manufacturing processes and tolerances, and that slight deviation from a circle shape (e.g., slight deviations on radial distance from center, etc.) may be present in a manufactured device.

Figure 6:
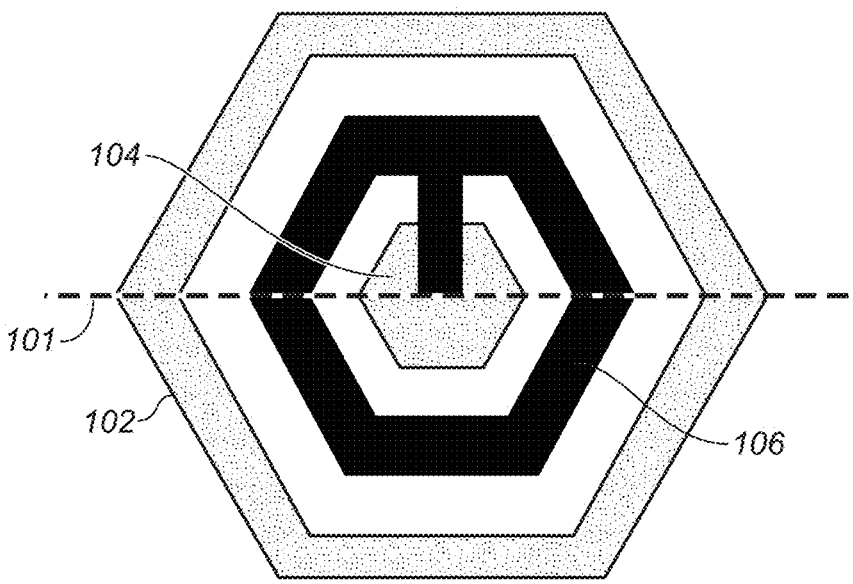
FIG. 6 is a top view of an example PMUT device having a hexagonal shape, according to some embodiments.

FIG. 6 is a top view of another example of the PMUT device 100 of FIG. 1 having a substantially hexagonal shape, which corresponds in part to a cross section along dotted line 101 in FIG. 6. Layout of surrounding edge support 102, interior support 104, and lower electrode 106 are illustrated, with other continuous layers not shown. It should be appreciated that the term "substantially" in "substantially hexagonal shape" is intended to convey that a PMUT device 100 is generally hexagon-shaped, with allowances for variations due to manufacturing processes and tolerances, and that slight deviation from a hexagon shape (e.g., rounded corners, slightly wavering lines, deviations from perfectly orthogonal corners or intersections, etc.) may be present in a manufactured device.

Figure 7:
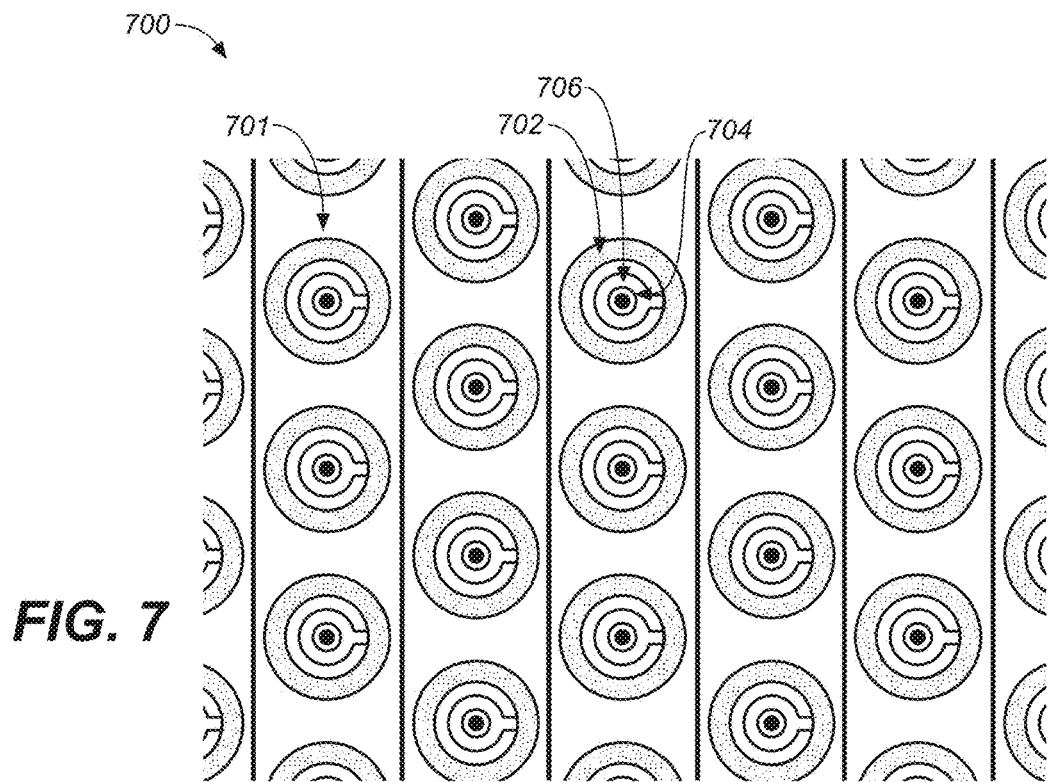
FIG. 7 illustrates an example array of circular-shaped PMUT devices, according to some embodiments.

FIG. 7 illustrates an example two-dimensional array 700 of circular-shaped PMUT devices 701 formed from PMUT devices having a substantially circular shape similar to that discussed in conjunction with FIGS. 1, 2 and 5. Layout of circular surrounding edge support 702, interior support 704, and annular or ring shaped lower electrode 706 surrounding the interior support 704 are illustrated, while other continuous layers are not shown for clarity. As illustrated, array 700 includes columns of circular-shaped PMUT devices 701 that are offset. It should be appreciated that the circular-shaped PMUT devices 701 may be closer together, such that edges of the columns of circular-shaped PMUT devices 701 overlap. Moreover, it should be appreciated that circular-shaped PMUT devices 701 may contact each other. In various embodiments, adjacent circular-shaped PMUT devices 701 are electrically isolated. In other embodiments, groups of adjacent circular-shaped PMUT devices 701 are electrically connected, where the groups of adjacent circular-shaped PMUT devices 701 are electrically isolated.

Figure 8:
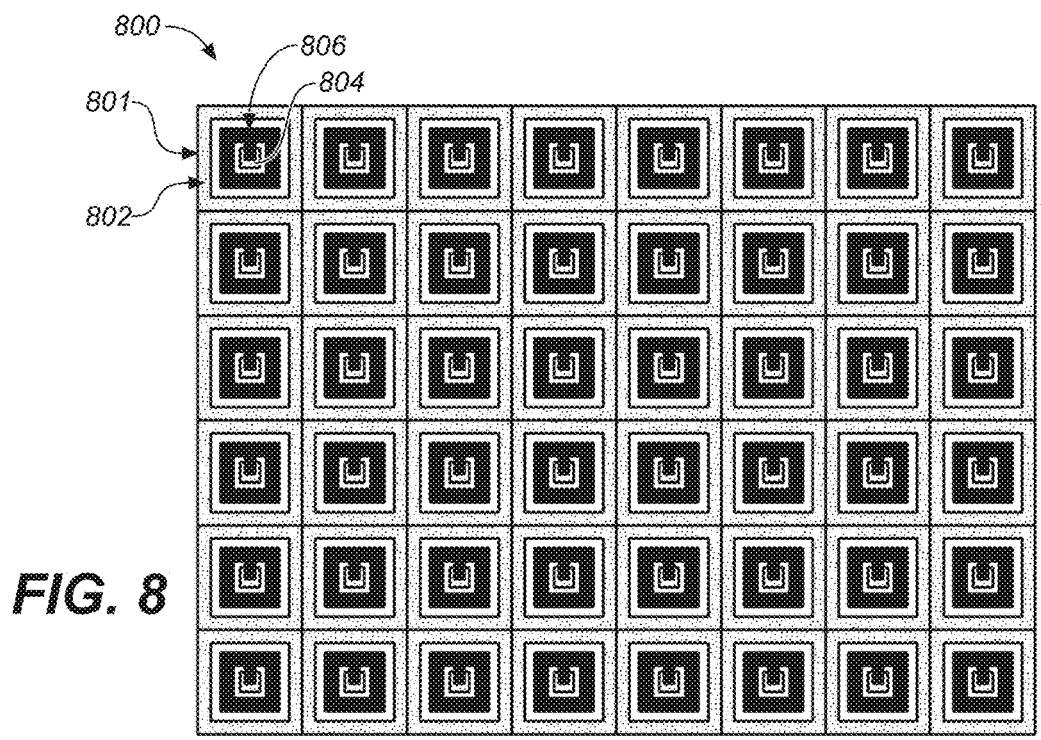
FIG. 8 illustrates an example array of square-shaped PMUT devices, according to some embodiments.

FIG. 8 illustrates an example two-dimensional array 800 of square-shaped PMUT devices 801 formed from PMUT devices having a substantially square shape similar to that discussed in conjunction with FIGS. 1, 2 and 3. Layout of square surrounding edge support 802, interior support 804, and square-shaped lower electrode 806 surrounding the interior support 804 are illustrated, while other continuous layers are not shown for clarity. As illustrated, array 800 includes columns of square-shaped PMUT devices 801 that are in rows and columns. It should be appreciated that rows or columns of the square-shaped PMUT devices 801 may be offset. Moreover, it should be appreciated that square-shaped PMUT devices 801 may contact each other or be spaced apart. In various embodiments, adjacent square-shaped PMUT devices 801 are electrically isolated. In other embodiments, groups of adjacent square-shaped PMUT devices 801 are electrically connected, where the groups of adjacent square-shaped PMUT devices 801 are electrically isolated.

Figure 9:
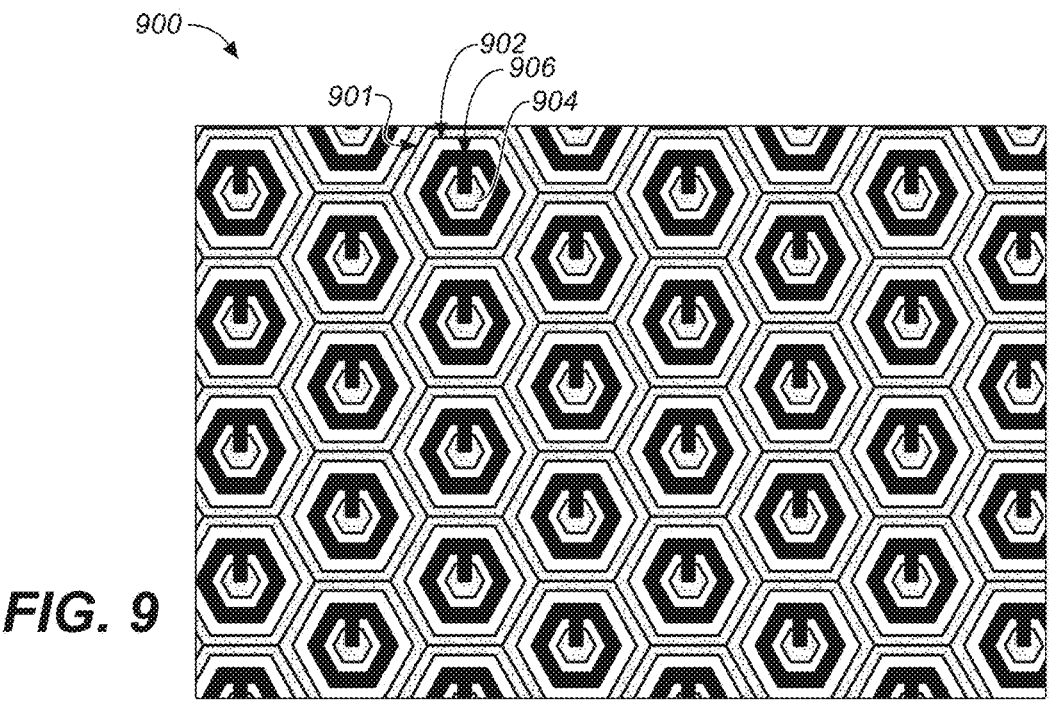
FIG. 9 illustrates an example array of hexagonal-shaped PMUT devices, according to some embodiments.

FIG. 9 illustrates an example two-dimensional array 900 of hexagon-shaped PMUT devices 901 formed from PMUT devices having a substantially hexagon shape similar to that discussed in conjunction with FIGS. 1, 2 and 6. Layout of hexagon-shaped surrounding edge support 902, interior support 904, and hexagon-shaped lower electrode 906 surrounding the interior support 904 are illustrated, while other continuous layers are not shown for clarity. It should be appreciated that rows or columns of the hexagon-shaped PMUT devices 901 may be offset. Moreover, it should be appreciated that hexagon-shaped PMUT devices 901 may contact each other or be spaced apart. In various embodiments, adjacent hexagon-shaped PMUT devices 901 are electrically isolated. In other embodiments, groups of adjacent hexagon-shaped PMUT devices 901 are electrically connected, where the groups of adjacent hexagon-shaped PMUT devices 901 are electrically isolated. While FIGS. 7, 8 and 9 illustrate example layouts of PMUT devices having different shapes, it should be appreciated that many different layouts are available. Moreover, in accordance with various embodiments, arrays of PMUT devices are included within a MEMS layer.

In operation, during transmission, selected sets of PMUT devices in the two-dimensional array can transmit an acoustic signal (e.g., a short ultrasonic pulse) and during sensing, the set of active PMUT devices in the two-dimensional array can detect an interference of the acoustic signal with an object (in the path of the acoustic wave). The received interference signal (e.g., generated based on reflections, echoes, etc. of the acoustic signal from the object) can then be analyzed. As an example, an image of the object, a distance of the object from the sensing component, a density of the object, a motion of the object, etc., can all be determined based on comparing a frequency and/or phase of the interference signal with a frequency and/or phase of the acoustic signal. Moreover, results generated can be further analyzed or presented to a user via a display device (not shown).

FIG. 10 illustrates a pair of example PMUT devices 1000 in a PMUT array, with each PMUT sharing at least one common edge support 1002. As illustrated, the PMUT devices have two sets of independent lower electrode labeled as 1006 and 1026. These differing electrode patterns enable antiphase operation of the PMUT devices 1000, and increase flexibility of device operation. In one embodiment, the pair of PMUTs may be identical, but the two electrodes could drive different parts of the same PMUT antiphase (one contracting, and one extending), such that the PMUT displacement becomes larger. While other continuous layers are not shown for clarity, each PMUT also includes an upper electrode (e.g., upper electrode 108 of FIG. 1). Accordingly, in various embodiments, a PMUT device may include at least three electrodes.

FIGS. 11A, 11B, 11C, and 11D illustrate alternative examples of interior support structures, in accordance with various embodiments. Interior supports structures may also be referred to as "pinning structures," as they operate to pin the membrane to the substrate. It should be appreciated that interior support structures may be positioned anywhere within a cavity of a PMUT device, and may have any type of shape (or variety of shapes), and that there may be more than one interior support structure within a PMUT device. While FIGS. 11A, 11B, 11C, and 11D illustrate alternative examples of interior support structures, it should be appreciated that these examples are for illustrative purposes, and are not intended to limit the number, position, or type of interior support structures of PMUT devices.

Figure 11A:
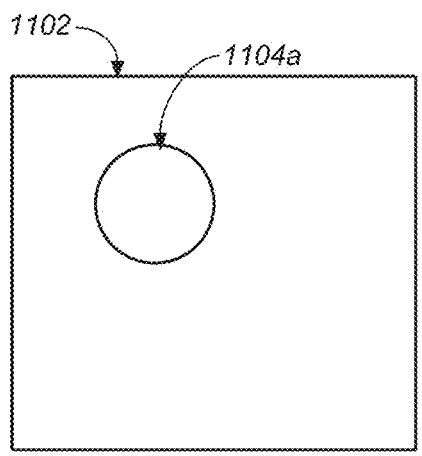
FIGS. 11A, 11B, 11C, and 11D illustrate alternative examples of interior support structures, according to various embodiments.
Figure 11B:
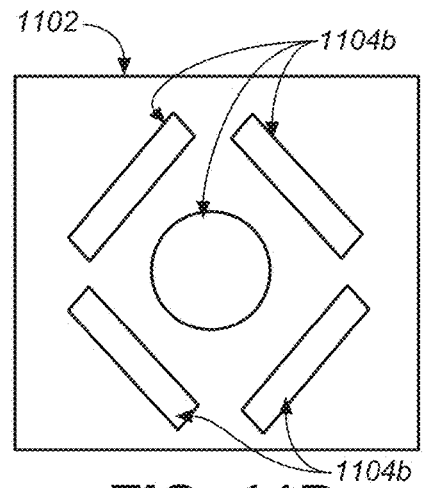
Figure 11C:
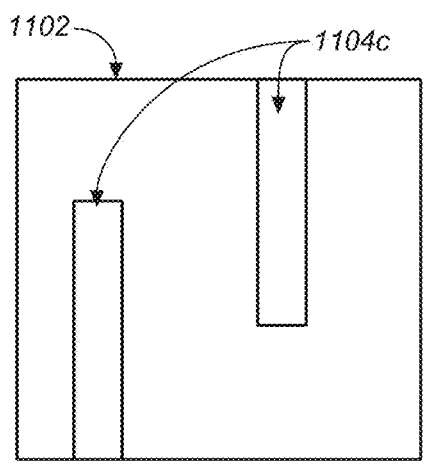
Figure 11D:
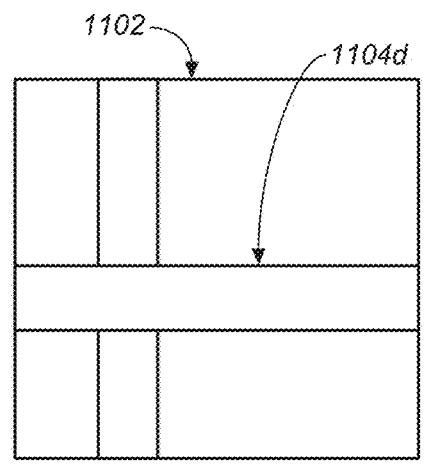

For example, interior supports structures do not have to be centrally located with a PMUT device area, but can be non-centrally positioned within the cavity. As illustrated in FIG. 11A, interior support 1104a is positioned in a non-central, off-axis position with respect to edge support 1102. In other embodiments such as seen in FIG. 11B, multiple interior supports 1104b can be used. In this embodiment, one interior support is centrally located with respect to edge support 1102, while the multiple, differently shaped and sized interior supports surround the centrally located support. In still other embodiments, such as seen with respect to FIGS. 11C and 11D, the interior supports (respectively 1104c and 1104d) can contact a common edge support 1102. In the embodiment illustrated in FIG. 11D, the interior supports 1104d can effectively divide the PMUT device into subpixels. This would allow, for example, activation of smaller areas to generate high frequency ultrasonic waves, and sensing a returning ultrasonic echo with larger areas of the PMUT device. It will be appreciated that the individual pinning structures can be combined into arrays.

Figure 12:
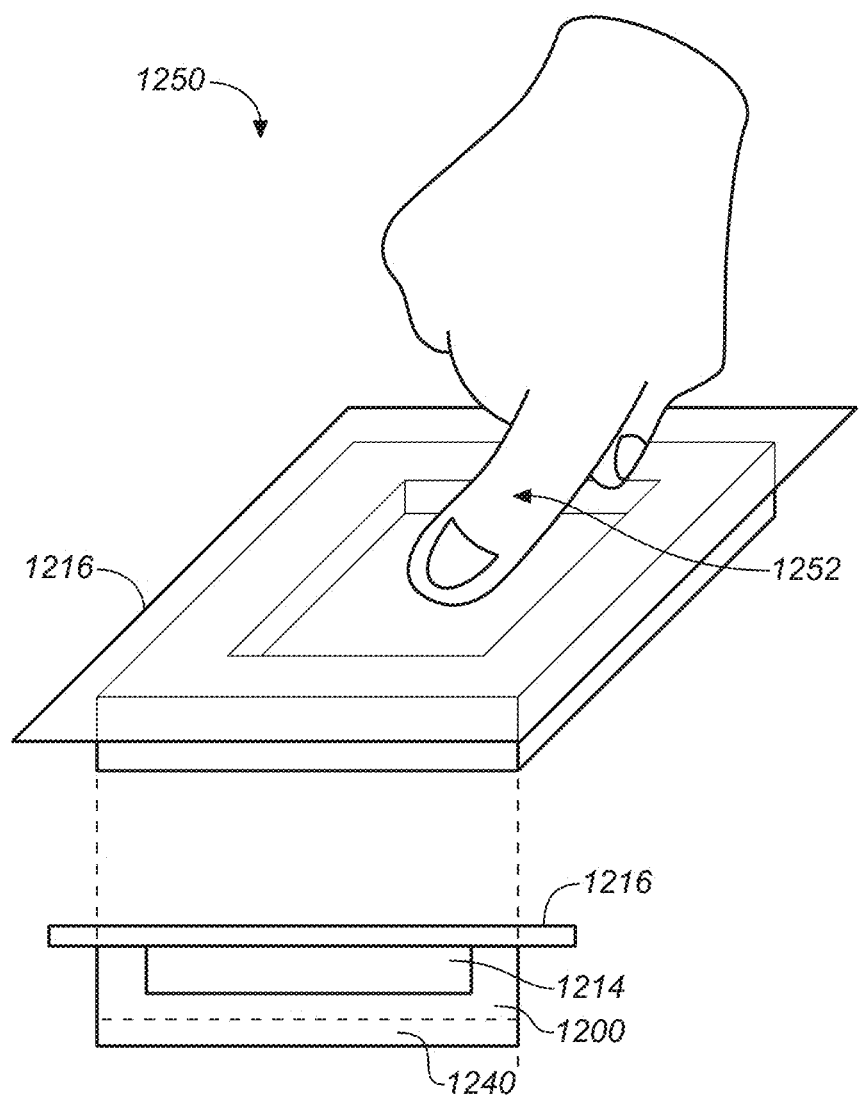
FIG. 12 illustrates a PMUT array used in an ultrasonic fingerprint sensing system, according to some embodiments.

FIG. 12 illustrates an embodiment of a PMUT array used in an ultrasonic fingerprint sensing system 1250. The fingerprint sensing system 1250 can include a platen 1216 onto which a human finger 1252 may make contact. Ultrasonic signals are generated and received by a PMUT device array 1200, and travel back and forth through acoustic coupling layer 1214 and platen 1216. Signal analysis is conducted using processing logic module 1240 (e.g., control logic) directly attached (via wafer bonding or other suitable techniques) to the PMUT device array 1200. It will be appreciated that the size of platen 1216 and the other elements illustrated in FIG. 12 may be much larger (e.g., the size of a handprint) or much smaller (e.g., just a fingertip) than as shown in the illustration, depending on the particular application.

In this example for fingerprinting applications, the human finger 1252 and the processing logic module 1240 can determine, based on a difference in interference of the acoustic signal with valleys and/or ridges of the skin on the finger, an image depicting epi-dermis and/or dermis layers of the finger. Further, the processing logic module 1240 can compare the image with a set of known fingerprint images to facilitate identification and/or authentication. Moreover, in one example, if a match (or substantial match) is found, the identity of user can be verified. In another example, if a match (or substantial match) is found, a command/operation can be performed based on an authorization rights assigned to the identified user. In yet another example, the identified user can be granted access to a physical location and/or network/computer resources (e.g., documents, files, applications, etc.)

In another example, for finger-based applications, the movement of the finger can be used for cursor tracking/movement applications. In such embodiments, a pointer or cursor on a display screen can be moved in response to finger movement. It is noted that processing logic module 1240 can include or be connected to one or more processors configured to confer at least in part the functionality of system 1250. To that end, the one or more processors can execute code instructions stored in memory, for example, volatile memory and/or nonvolatile memory.

Figure 13:
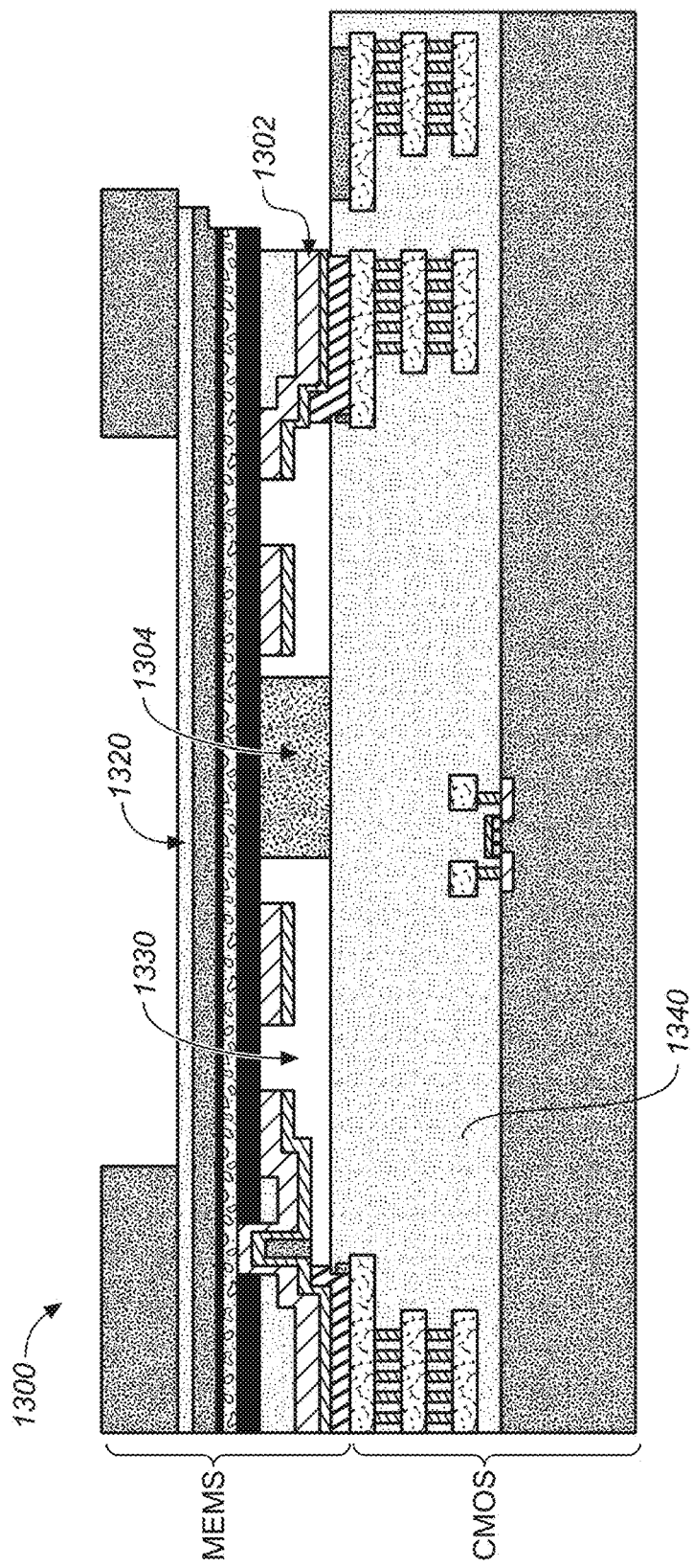
FIG. 13 illustrates an integrated fingerprint sensor formed by wafer bonding a CMOS logic wafer and a microelectromechanical (MEMS) wafer defining PMUT devices, according to some embodiments.

FIG. 13 illustrates an integrated fingerprint sensor 1300 formed by wafer bonding a CMOS logic wafer and a MEMS wafer defining PMUT devices, according to some embodiments. FIG. 13 illustrates in partial cross section one embodiment of an integrated fingerprint sensor formed by wafer bonding a substrate 1340 CMOS logic wafer and a MEMS wafer defining PMUT devices having a common edge support 1302 and separate interior support 1304. For example, the MEMS wafer may be bonded to the CMOS logic wafer using aluminum and germanium eutectic alloys, as described in U.S. Pat. No. 7,442,570. PMUT device 1300 has an interior pinned membrane 1320 formed over a cavity 1330. The membrane 1320 is attached both to a surrounding edge support 1302 and interior support 1304. The membrane 1320 is formed from multiple layers.

Example Operation of a Two-Dimensional Array of Ultrasonic Transducers

Systems and methods disclosed herein, in one or more aspects provide for the operation of a two-dimensional array of ultrasonic transducers (e.g., an array of piezoelectric micromachined actuated transducers or PMUTs). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

Figure 14:
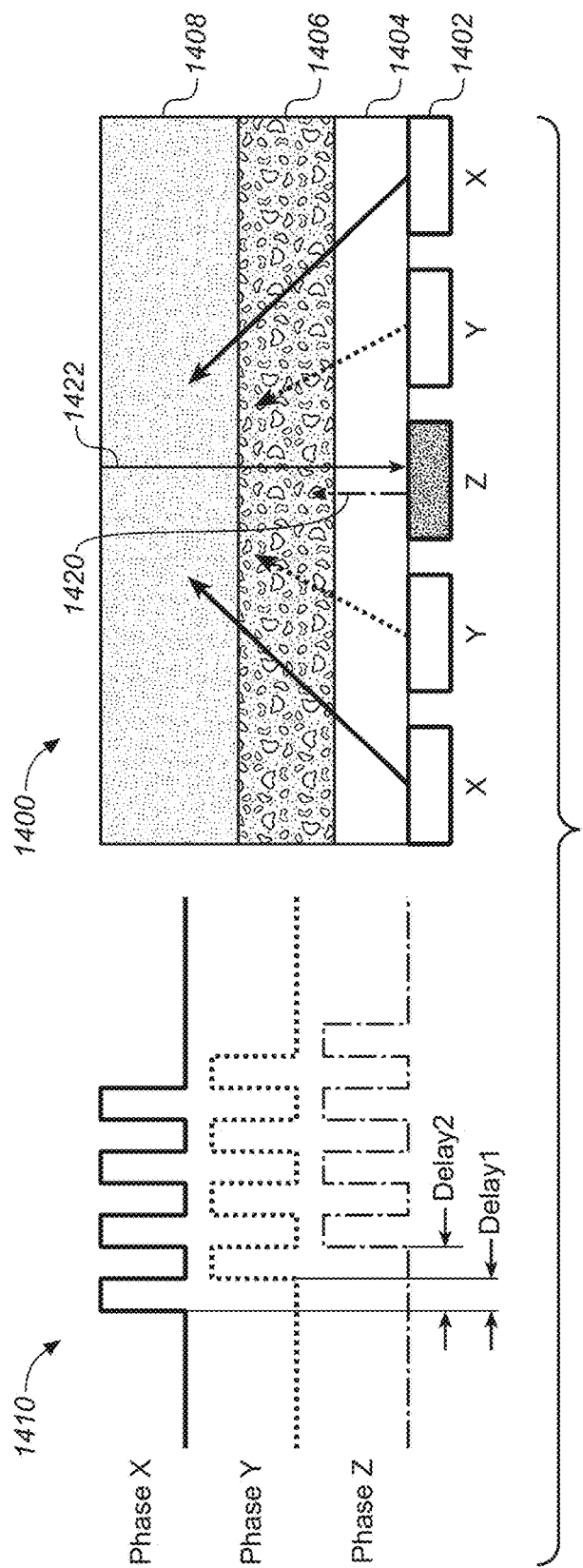
FIG. 14 illustrates an example ultrasonic transducer system with phase delayed transmission, according to some embodiments.

FIG. 14 illustrates an example ultrasonic transducer system 1400 with phase delayed transmission, according to some embodiments. As illustrated, FIG. 14 shows ultrasonic beam transmission and reception using a one-dimensional, five-element, ultrasonic transducer system 1400 having phase delayed inputs 1410. In various embodiments, ultrasonic transducer system 1400 is comprised of PMUT devices having a center pinned membrane (e.g., PMUT device 100 of FIG. 1).

As illustrated, ultrasonic transducer system 1400 includes five ultrasonic transducers 1402 including a piezoelectric material and activating electrodes that are covered with a continuous stiffening layer 1404 (e.g., a mechanical support layer). Stiffening layer 1404 contacts acoustic coupling layer 1406, and in turn is covered by a platen layer 1408. In various embodiments, the stiffening layer 1404 can be silicon, and the platen layer 1408 formed from metal, glass, sapphire, or polycarbonate or similar durable plastic. The intermediately positioned acoustic coupling layer 1406 can be formed from a plastic or gel such as polydimethylsiloxane (PDMS), epoxy, or other material. In one embodiment, the material of acoustic coupling layer 1406 has an acoustic impedance selected to be between the acoustic impedance of layers 1404 and 1408. In one embodiment, the material of acoustic coupling layer 1406 has an acoustic impedance selected to be close the acoustic impedance of platen layer 1408, to reduce unwanted acoustic reflections and improve ultrasonic beam transmission and sensing. However, alternative material stacks to the one shown in FIG. 14 may be used and certain layers may be omitted, provided the medium through which transmission occurs passes signals in a predictable way.

In operation, and as illustrated in FIG. 14, the ultrasonic transducers 1402 labelled with an "x" are triggered to emit ultrasonic waves at an initial time. At a second time, (e.g., 1-100 nanoseconds later), the ultrasonic transducers 1402 labelled with a "y" are triggered. At a third time (e.g., 1-100 nanoseconds after the second time) the ultrasonic transducer 1402 labelled with a "z" is triggered. The ultrasonic waves transmitted at different times cause interference with each other, effectively resulting in a single high intensity beam 1420 that exits the platen layer 1408, contacts objects, such as a finger (not shown), that contact the platen layer 1408, and is in part reflected back to the ultrasonic transducers. In one embodiment, the ultrasonic transducers 1402 are switched from a transmission mode to a reception mode, allowing the "z" ultrasonic transducer to detect any reflected signals. In other words, the phase delay pattern of the ultrasonic transducers 1402 is symmetric about the focal point where high intensity beam 1420 exits platen layer 1408.

It should be appreciated that an ultrasonic transducer 1402 of ultrasonic transducer system 1400 may be used to transmit and/or receive an ultrasonic signal, and that the illustrated embodiment is a non-limiting example. The received signal 1422 (e.g., generated based on reflections, echoes, etc. of the acoustic signal from an object contacting or near the platen layer 1408) can then be analyzed. As an example, an image of the object, a distance of the object from the sensing component, acoustic impedance of the object, a motion of the object, etc., can all be determined based on comparing a frequency, amplitude and/or phase of the received interference signal with a frequency, amplitude and/or phase of the transmitted acoustic signal. Moreover, results generated can be further analyzed or presented to a user via a display device (not shown).

Figure 15:
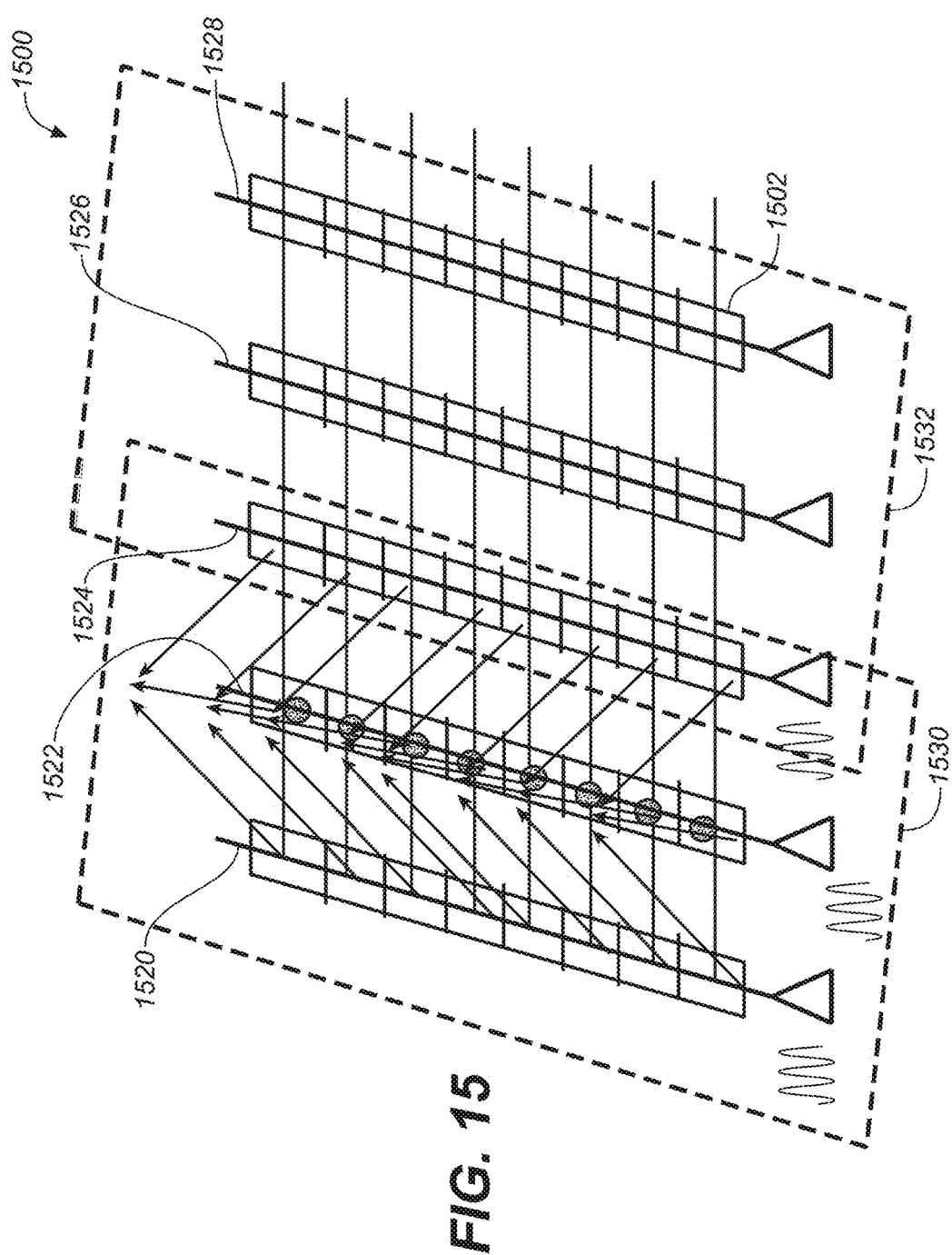
FIG. 15 illustrates another example ultrasonic transducer system with phase delayed transmission, according to some embodiments.

FIG. 15 illustrates another example ultrasonic transducer system 1500 with phase delayed transmission, according to some embodiments. As illustrated, FIG. 15 shows ultrasonic beam transmission and reception using a virtual block of two-dimensional, 24-element, ultrasonic transducers that form a subset of a 40-element ultrasonic transducer system 1500 having phase delayed inputs. In operation, an array position 1530 (represented by the dotted line), also referred to herein as a virtual block, includes columns 1520, 1522 and 1524 of ultrasonic transducers 1502. At an initial time, columns 1520 and 1524 of array position 1530 are triggered to emit ultrasonic waves at an initial time. At a second time (e.g., several nanoseconds later), column 1522 of array position 1530 is triggered. The ultrasonic waves interfere with each other, substantially resulting in emission of a high intensity ultrasonic wave centered on column 1522. In one embodiment, the ultrasonic transducers 1502 in columns 1520 and 1524 are switched off, while column 1522 is switched from a transmission mode to a reception mode, allowing detection of any reflected signals.

In one embodiment, after the activation of ultrasonic transducers 1502 of array position 1530, ultrasonic transducers 1502 of another array position 1532, comprised of columns 1524, 1526, and 1528 of ultrasonic transducers 1502 are triggered in a manner similar to that described in the foregoing description of array position 1530. In one embodiment, ultrasonic transducers 1502 of another array position 1532 are activated after a detection of a reflected ultrasonic signal at column 1522 of array position 1530. It should be appreciated that while movement of the array position by two columns of ultrasonic transducers is illustrated, movement by one, three, or more columns rightward or leftward is contemplated, as is movement by one or more rows, or by movement by both some determined number of rows and columns. In various embodiments, successive array positions can be either overlapping in part, or can be distinct. In some embodiments the size of array positions can be varied. In various embodiments, the number of ultrasonic transducers 1502 of an array position for emitting ultrasonic waves can be larger than the number of ultrasonic transducers 1502 of an array position for ultrasonic reception. In still other embodiments, array positions can be square, rectangular, ellipsoidal, circular, or more complex shapes such as crosses.

Figures 16, 17:
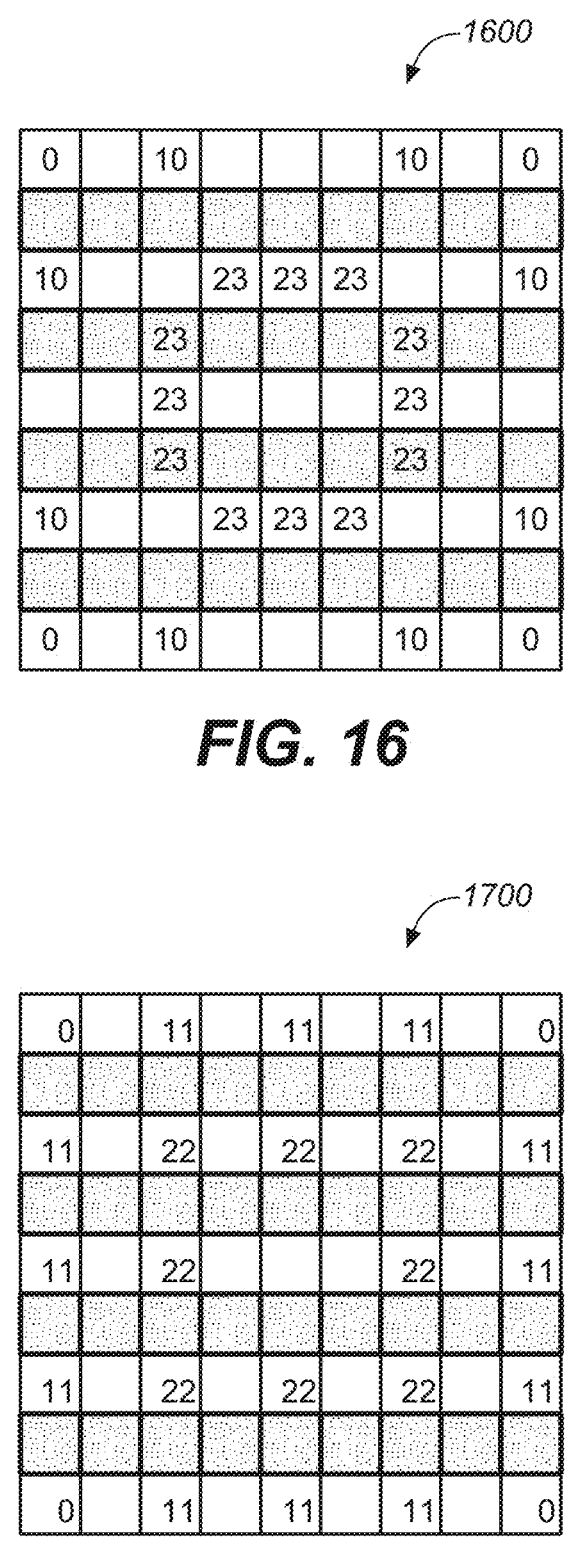

FIG. 16 illustrates an example phase delay pattern for ultrasonic signal transmission of a 9×9 ultrasonic transducer block 1600 of a two-dimensional array of ultrasonic transducers, according to some embodiments. As illustrated in FIG. 16, each number in the ultrasonic transducer array is equivalent to the nanosecond delay used during operation, and an empty element (e.g., no number) in the ultrasonic transducer block 1600 means that an ultrasonic transducer is not activated for signal transmission during operation. In various embodiments, ultrasonic wave amplitude can be the same or similar for each activated ultrasonic transducer, or can be selectively increased or decreased relative to other ultrasonic transducers. In the illustrated pattern, initial ultrasonic transducer activation is limited to corners of ultrasonic transducer block 1600, followed 10 nanoseconds later by a rough ring around the edges of ultrasonic transducer block 1600. After 23 nanoseconds, an interior ring of ultrasonic transducers is activated. Together, the twenty-four activated ultrasonic transducers generate an ultrasonic beam centered on the ultrasonic transducer block 1600. In other words, the phase delay pattern of ultrasonic transducer block 1600 is symmetric about the focal point where a high intensity beam contacts an object.

It should be appreciated that different ultrasonic transducers of ultrasonic transducer block 1600 may be activated for receipt of reflected ultrasonic signals. For example, the center 3×3 ultrasonic transducers of ultrasonic transducer block 1600 may be activated to receive the reflected ultrasonic signals. In another example, the ultrasonic transducers used to transmit the ultrasonic signal are also used to receive the reflected ultrasonic signal. In another example, the ultrasonic transducers used to receive the reflected ultrasonic signals include at least one of the ultrasonic transducers also used to transmit the ultrasonic signals.

FIG. 17 illustrates another example phase delay pattern for a 9×9 ultrasonic transducer block 1700, according to some embodiments. As illustrated in FIG. 17, the example phase delay pattern utilizes equidistant spacing of transmitting ultrasonic transducers. As illustrated in FIG. 16, each number in the ultrasonic transducer array is equivalent to the nanosecond delay used during operation, and an empty element (e.g., no number) in the ultrasonic transducer block 1700 means that an ultrasonic transducer is not activated for signal transmission during operation. In the illustrated embodiment, the initial ultrasonic transducer activation is limited to corners of ultrasonic transducer block 1700, followed 11 nanoseconds later by a rough ring around the edges of ultrasonic transducer block 1700. After 22 nanoseconds, an interior ring of ultrasonic transducers is activated. The illustrated embodiment utilizes equidistant spacing of the transmitting ultrasonic transducers to reduce issues with crosstalk and heating, wherein each activated ultrasonic transducers is surrounded by un-activated ultrasonic transducers. Together, the twenty-four activated ultrasonic transducers generate an ultrasonic beam centered on the ultrasonic transducer block 1700.

Example Operation of a Fingerprint Sensor Comprised of Ultrasonic Transducers Various embodiments described herein provide a finger detection mode for identifying if a finger has been placed on a fingerprint sensor. If a finger's presence is detected on the fingerprint sensor, in one embodiment, the system will exit the finger detection mode in order capture the fingerprint image. Embodiments described herein provide for a finger detection mode that minimizes the number of false rejects and minimizes power consumption of the fingerprint sensor. In finger detection mode, a false reject is defined as failing to recognize that a finger is present on the sensor when a finger is in fact interacting with the fingerprint sensor. False rejects are viewed as catastrophic failures in finger detection mode, because they could prevent a user from turning on the device. False accepts (e.g., the fingerprint sensor detects a finger when no finger is present) increase the average power consumption of the system because the fingerprint sensor and associated processor activate to do a full fingerprint scan even though no finger is present. As a result, minimizing false accepts is related to minimizing power consumption.

The disclosure recognizes and addresses, in at least certain embodiments, the issue of power consumption and lack of a power efficient always-on approach to sensing and analyzing human touch at a device. To that end, embodiments described herein permit or otherwise facilitate sensing of human touch that can be performed continually or nearly continually by separating a low-power detection stage from a full-power analysis stage. The detection stage is implemented continually or nearly continually and causes system circuitry to perform analysis of the human touch after the low-power detection stage has confirmed the human touch.

Implementation of the low-power detection stage permits removal of physical actuation device (e.g., buttons or the like) while maintaining low power consumption. Absence of a physical actuation device does not hinder low-power consumption and does simplify user-device interaction when sensing human touch. While embodiments of the disclosure are illustrated with reference to a mobile electronic device, the embodiments are not limited in this respect and the embodiments can be applied to any device (mobile or otherwise) having a surface that is sensitive to touch and permits or otherwise facilitates control of the device by an end-user. Such a touch-sensitive surface can embody or can constitute, for example, a fingerprint sensor. Mobile devices can be embodied in or can include consumer electronics devices (e.g., smartphones, portable gaming devices); vehicular devices (such as navigation and/or entertainment system device); medical devices; keys (e.g., for locking and gaining access to buildings, storage receptacles, cars, etc.); and the like.

When compared to conventional technologies, embodiments described herein can provide numerous improvements. For example, splitting the sensing of human touch into a low power, always-on detection stage and a triggered, full-power analysis stage permits sensing human touch continuously or nearly continuously, without causing battery drainage or other inefficiencies. Therefore, embodiments described herein permit removal of physical actuation triggers that are present in typical consumer electronics products, thus simplifying user-device interaction while sensing human touch. More specifically, rather than asking an end-user to provide some activation trigger (such as pressing a button) before the fingerprint sensing is turned on, for example, the low-power detection stage of the disclosure is implemented continually and trigger analysis when human touch is detected. For another example, in view of the removal of physical actuation device for human sensing, embodiments of the disclosure provide greater flexibility of product design. In one embodiment, a touch-screen display device can be implemented with a uniform (and fixed) screen without a button press section. As such, the touch-screen display device can provide always-on sensing of human touch while providing larger viewing area and lower manufacturing cost for a product incorporating embodiments of this disclosure. In contrast, conventional sensor technology can operate one-hundred percent of the time if a physical trigger is not desired, which would impose prohibitive power consumption demands.

Figure 18A:
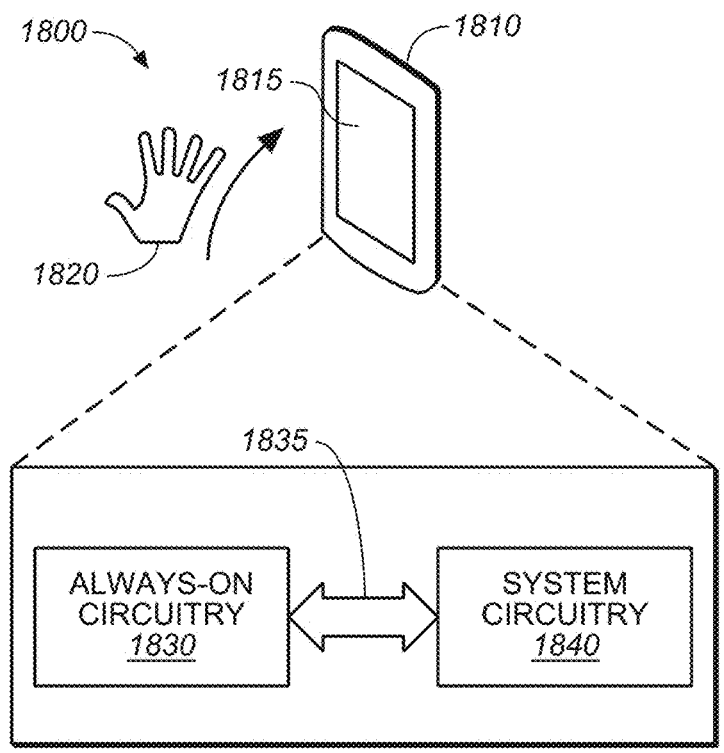
FIG. 18A illustrates an example of an operational environment for sensing of human touch, according to some embodiments.

With reference to the drawings, FIG. 18A illustrates an example of an operational environment 1800 for sensing of human touch in accordance with one or more embodiments of the disclosure. As illustrated, a device 1810 includes a fingerprint sensor 1815 or other type of surface sensitive to touch. In one embodiment, fingerprint sensor 1815 is disposed beneath a touch-screen display device of device 1810. In another embodiment, fingerprint sensor 1815 is disposed adjacent or close to a touch-screen display device of device 1810. In another embodiment, fingerprint sensor 1815 is comprised within a touch-screen display device of device 1810. It should be appreciated that device 1810 includes a fingerprint sensor 1815 for sensing a fingerprint of a finger interacting with device 1810.

In one embodiment, a human finger (represented by a hand 1820), can touch or interact with a specific area of device 1810 proximate fingerprint sensor 1815. In various embodiments, fingerprint sensor 1815 can be hard and need not include movable parts, such as a sensor button configured to detect human touch or otherwise cause the device 1810 to respond to human touch. The device 1810 can include circuitry that can operate in response to touch (human or otherwise) of the touch-screen display device and/or fingerprint sensor 1815 (or, in some embodiments, the other type of touch sensitive surface).

In accordance with the described embodiments, device 1810 includes always-on circuitry 1830 and system circuitry 1840. It should be appreciated that components of always-on circuitry 1830 and system circuitry 1840 might be disposed within the same componentry, and are conceptually distinguished herein such that always-on circuitry 1830 includes components that are always-on, or mostly always-on, and system circuitry 1840 includes components that are powered off until they are powered on, for example, in response to an activation signal received from always-on circuitry 1830. For example, such circuitry can be operatively coupled (e.g., electrically coupled, communicative coupled, etc.) via a bus architecture 1835 (or bus 1835) or conductive conduits configured to permit the exchange of signals between the always-on circuitry 1830 and the system circuitry 1840. In some embodiments, a printed circuit board (PCB) placed behind a touch-screen display device can include the always-on circuitry 1830, the system circuitry 1840, and the bus 1835. In one embodiment, the always-on circuitry 1830 and the system circuitry 1840 can be configured or otherwise arranged in a single semiconductor die. In another embodiment, the always-on circuitry 1830 can be configured or otherwise arranged in a first semiconductor die and the system circuitry 1840 can be configured or otherwise arranged in a second semiconductor die. In addition, in some embodiments, the bus 1835 can be embodied in or can include a dedicated conducting wire or a dedicated data line that connects the always-on circuitry 1830 and the system circuitry 1840.

The always-on circuitry 1830 can operate as sensor for human touch and the system circuitry 1840, or a portion thereof, can permit or otherwise facilitate analysis of the human touch. As described herein, always-on circuitry 1830 includes fingerprint sensor 1815. For example, responsive to capturing an image of a fingerprint, fingerprint sensor 1815 can transmit the captured image to system circuitry for analysis.

The analysis can include fingerprint recognition or other types of biometric evaluations. The always-on circuitry 1830 can be energized or otherwise power-on continuously or nearly continuously and can be configured to monitor touch of fingerprint sensor 1815. In addition, in response to human touch (e.g., touch by a human finger or other human body part), the always-on circuitry 1830 can be further configured to trigger detection and/or another type of analysis of elements of the human touch or a human body associated therewith. To at least that end, the always-on circuitry 1830 can be configured to implement a first phase of a finger detection mode (also referred to as FDMA).

Figure 18B:
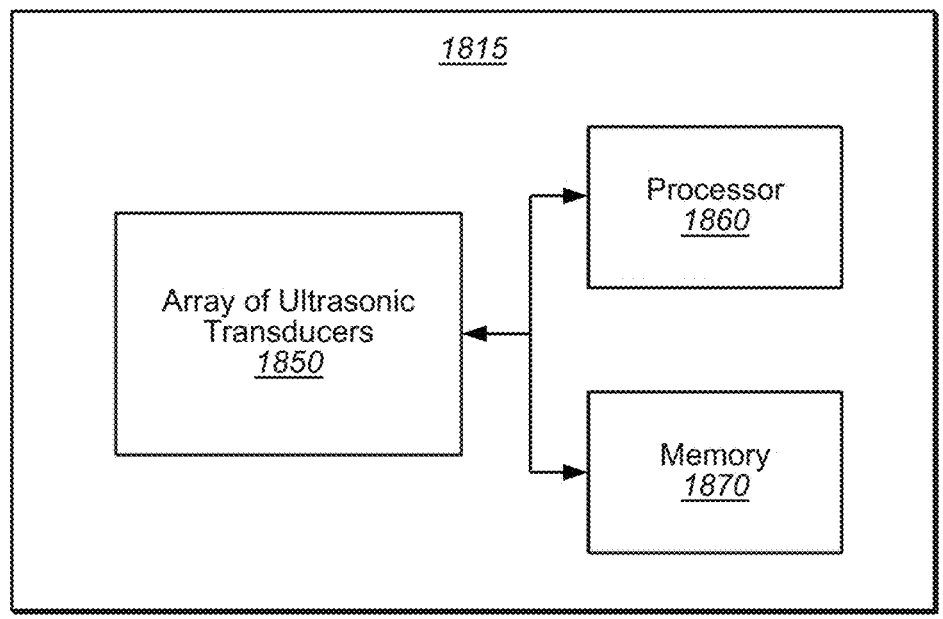
FIG. 18B illustrates an example fingerprint sensor, in accordance with various embodiments.

FIG. 18B illustrates an example fingerprint sensor 1815, in accordance with various embodiments. In one embodiment, fingerprint sensor 1815 includes an array 1850 of ultrasonic transducers (e.g., PMUT devices), a processor 1860, and a memory 1870. In various embodiments, processor 1860 performs certain operations in accordance with instructions stored within memory 1870. It should be appreciated that components of fingerprint sensor 1815 are examples, and that certain components, such as processor 1860 and/or memory 1870 may not be located within fingerprint sensor 1815. For example, always-on circuitry 1830 or system circuitry 1840 may include a processor and/or memory for performing certain operations.

In one embodiment, fingerprint sensor 1815 includes processor 1860 for performing the pixel capture. In other embodiments, processor 1860 can perform thresholding to determine whether an object has interacted with fingerprint sensor 1815. In other embodiments, processor 1860 can analyze captured pixels and determine whether the object is a finger. In other embodiments, processor 1860 can capture an image of the fingerprint and forward it to a processor of system circuitry 1840 for further analysis.

While the embodiment of FIG. 18B includes processor 1860 and memory 1870, as described above, it should be appreciated that various functions of processor 1860 and memory 1870 may reside in other components of device 1810 (e.g., within always-on circuitry 1830 or system circuitry 1840). Moreover, it should be appreciated that processor 1860 may be any type of processor for performing any portion of the described functionality (e.g., custom digital logic).

In various embodiments, a power supply can energize at least a portion of the system circuitry 1840 according with trigger signaling (or other type of control signal) provided (e.g., generated and transmitted) by the always-on circuitry 1830. For example, system circuitry 1840 can include a power controller that can receive trigger signaling (e.g., a control instruction) and, in response, can energize at least one processor of the system circuitry 1840 from a power-save state to a full-power state. The at least one processor that transitions from the power-save state to the full power state can execute one or more analyses in order to analyze features (e.g., fingerprints) of an image of a fingerprint from the fingerprint sensor 1815 that triggered the trigger signaling. In various embodiments, the analysis of the image of a fingerprint can include computer-accessible instruction (e.g., computer-readable instructions and/or computer-executable instructions) that in response to execution by a processor can permit or otherwise facilitate the device 1810 to implement a defined algorithm (or process) for fingerprint identification or analysis.

In various embodiments, fingerprint sensor 1815 can include ultrasonic transducers (e.g., PMUTs or capacitive micromachined ultrasonic transducers (CMUTs)) able to generate and detect pressure waves. Examples of PMUT devices and arrays of PMUT devices are described in accordance with FIGS. 1-17 above. In embodiments, a device 1810 includes fingerprint sensor 1815 comprised of an array of PMUT devices that can facilitate ultrasonic signal generation and sensing (transducer). For example, fingerprint sensor 1815 can include a silicon wafer having a two-dimensional (or one-dimensional) array of ultrasonic transducers.

In one embodiment, fingerprint sensor 1815 having an array of PMUT pixels is comprised within always-on circuitry 1830 to detect a touch of the ultrasonic fingerprint sensor by reading an always-on first pixel subset of the array of PMUT pixels. In response to detecting the touch using the always-on first pixel subset, a second pixel subset is activated to determine if the touch is associated with a human finger. In one embodiment, the second pixel subset is activated in response to detecting a touch of something consistent with a human finger. Always-on circuitry 1830 includes circuitry to respond to a determination that the touch is associated with a human finger and trigger a move from the first pixel subset to activating the second pixel subset, including activating all of the array of PMUT pixels in the ultrasonic fingerprint sensor to capture an image of the fingerprint of a detected finger.

For example, the use of ultrasonic circuitry allows for low power operation of a fingerprint sensor 1815. For example, a PMUT array can operate in a first low power mode to detect a touch on the ultrasonic fingerprint sensor by reading an always-on first pixel subset of the array of PMUT pixels. In response to detecting the touch using the always-on first pixel subset, the PMUT array is switched to operate in a second low power mode using a second pixel subset activated to determine if the touch is associated with a human finger. If characteristics of a fingerprint, such as ridges or valleys, are detected the PMUT array switches into operating in a full power mode. It should be appreciated that the activation in full-power mode may be instantiated by either the always-on circuitry 1830 or the system circuitry 1840. In one embodiment, substantially all of the PMUT devices of the array of fingerprint sensor 1815 are used to analyze the image of a fingerprint associated with the human finger. After completion of fingerprint scanning, the PMUT array can be switched back to low power operation.

Figure 19:
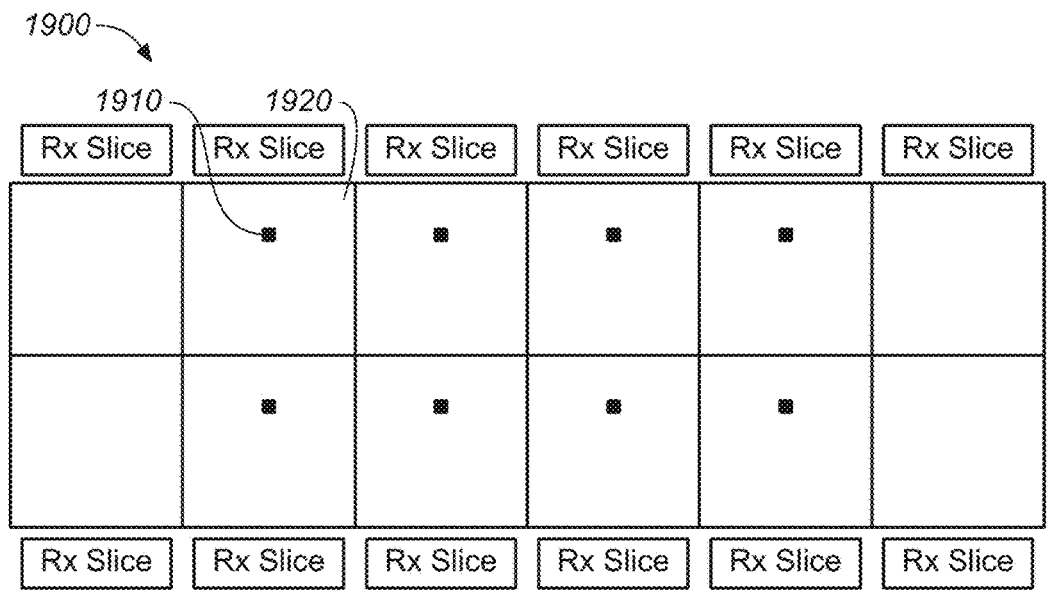
FIG. 19 illustrates example operation in a first phase of a finger detection mode associated with a two-dimensional array of ultrasonic transducers, according to some embodiments.

FIG. 19 illustrates example operation in a first phase of a finger detection mode associated with a two-dimensional array 1900 of ultrasonic transducers, according to some embodiments. In one embodiment, the first phase of the finger detection mode includes the activation of a first subset of ultrasonic transducers for capturing single pixels (e.g., pixel 1910) within a block (e.g., block 1920) of two-dimensional array 1900. For example, two-dimensional array 1900 includes twelve blocks of 24×24 ultrasonic devices. As illustrated, the first phase includes activation of ultrasonic devices of the middle eight 24×24 blocks 1920 of ultrasonic transducers for capturing a single pixel within each activated block. While the illustrated embodiment shows only eight of the twelve blocks activated, and only ultrasonic transducers activated for capturing a single pixel within the activated blocks, it should be appreciated that any number of blocks may be activated, that the pixel may be located at any position within a block, and any number of ultrasonic transducers may be activated for capturing any number of pixels, and that the illustrated embodiment is an example of many different possibilities. Moreover, it should be appreciated that the two-dimensional array can include any number of ultrasonic transducers, and the two-dimensional array may be divided into any number of independently operable blocks. Furthermore, as described above, embodiments described herein provide for utilizing multiple ultrasonic transducers, some of which may be time-delayed relative to each other, to focus a transmit beam to capture a pixel of an image.

In the illustrated embodiment, pixel 1910 is periodically captured in the first phase of the finger detection mode. Although a single pixel is illustrated, it will be understood that multiple pixels can be used, either grouped together or distributed throughout the array. Also, each pixel may be imaged by activating a plurality of PMUTs around the pixel. When a significant change in ultrasonic wave receive intensity occurs due to the presence of an object positioned near a sensor platen (not shown), circuitry is activated to switch the pixel array out of the first low power mode. In one embodiment, the first phase includes activating a small subset of the pixels in the array in a highly duty-cycled manner. For example, as illustrated, the 8-pixel pattern illustrated in FIG. 19 is activated. In various embodiments, these pixels are operated at a rate of 50-100 samples/second. On each transmit/receive cycle, the signal from each pixel would be compared to a threshold (e.g., a single value or an offset plus/minus a range). For example, if the signal on M or more pixels exceeds a single value, the system will proceed to a second phase of the finger detection mode (also referred to as FDMB). In another example, if the signal on M or more pixels falls outside of an offset plus/minus a range (where 'M' is a programmable setting), the system will proceed to a second phase of the finger detection mode. Otherwise, the system will remain in the first phase of the finger detection mode. It should be appreciated that many types of thresholding may be performed. For example, in another embodiment, a sum of the received signals may be compared with a threshold, the received signals may be divided into groups and compared to a threshold, etc.

In various embodiments, a position of the pixel captured during the first phase of the finger detection mode is moved during the first phase of the finger detection mode. For example, using the same pixel may increase the likelihood of a false reading, as the features or position of the pixel may not be indicative of contact or lack of contact with the array. Moreover, sensor lifetime may be reduced by excessive usage of the same ultrasonic sensors of the array. Imaging different pixels of the array may improve the accuracy of the first phase of the finger detection mode In some embodiments, the pixel selection sequence is random within an array or blocks of an array. In other embodiments, the pixel selection sequence is deterministic within an array or blocks of an array. In some embodiments, consecutive pixels (e.g., from left to right and proceeding to the next lower row of pixels) are selected. In other embodiments the ordering of selected pixels is performed according a predetermined order. In some embodiments, all pixels are selected before a pixel selection sequence is completed (e.g., each pixel is selected once before a pixel can be selected again). It should be appreciated that any ordering of pixel selection sequence can be used.

In some embodiments, the pixel selection is constrained to a subset of pixels of an array or a block. For example, pixel selection may be constrained to pixels within a particular region of a block. In a particular example, consider a 24×24 block of ultrasonic devices (e.g., block 1920 of FIG. 19). In one embodiment, pixel selection is constrained to the middle 16×16 pixels of the block. In the current example, the pixel selection sequence is performed for each pixel of the 16×16 blocks (totaling 256 pixels) before the pixel selection sequence is repeated.

As described herein, the first phase of the finger detection is operable to determine whether an object has come in contact with or interacted with a fingerprint sensor. In this manner, if it is not determined that an object has interacted with the fingerprint sensor (e.g., the change in ultrasonic wave intensity does exceed a threshold), then the fingerprint sensor remains in the first phase of the finger detection mode. In various embodiments, the first phase of the finger detection mode only activates ultrasonic transducers for capturing a small number of pixels, thus requiring a low amount of power relative to the full operation of the fingerprint sensor.

Figure 20:
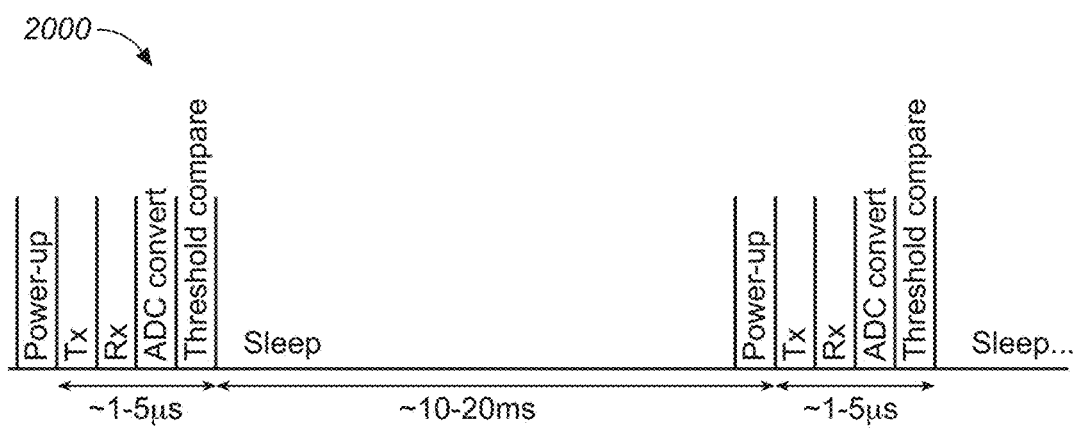
FIG. 20 illustrates an example duty-cycle timeline 2000 for the first phase of the finger detection mode, according to an embodiment.

FIG. 20 illustrates an example duty-cycle timeline 2000 for the first phase of the finger detection mode, according to an embodiment. As illustrated, fingerprint sensor powers-up the ultrasonic transducers for capturing the particular pixels, transmits (Tx) an ultrasonic signal, receives (Rx) an ultrasonic signal, performs an analog to digital (ADC) conversion of the received ultrasonic signal, and compares the digital signal to a stored threshold. For example, this process may take 1-100 μs. If the threshold range is not exceeded, the fingerprint sensor enters a sleep state for a period (e.g., 10-20 ms). This cycle is repeated until the threshold comparison results in detecting an object contacting or interacting with the fingerprint sensor as indicated by exceeding the threshold range.

Figure 21:
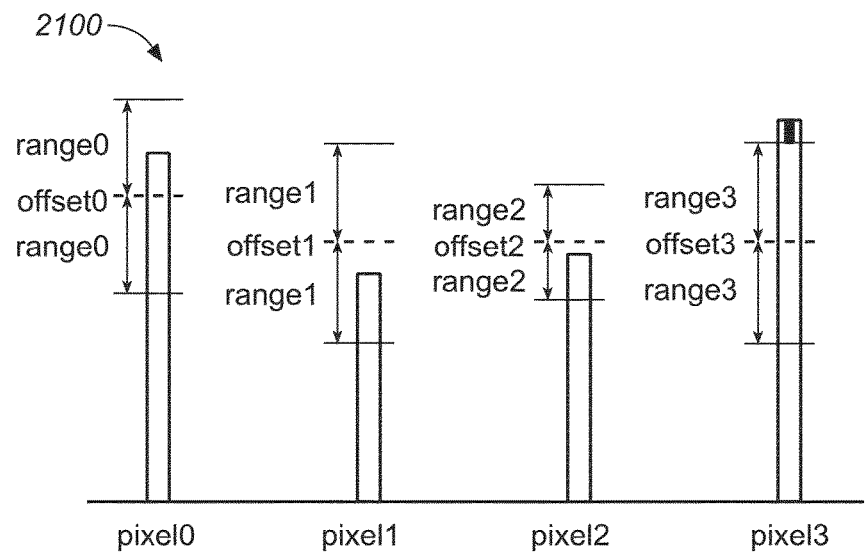
FIG. 21 illustrates an example of thresholding for the first phase of the finger detection mode, in accordance with various embodiments.

FIG. 21 illustrates an example of thresholding 2100 for the first phase of the finger detection mode, in accordance with various embodiments. In various embodiments, the threshold is described herein as an offset plus/minus a range. In other embodiments, the threshold includes a range from a low threshold to a high threshold. As illustrated, the thresholding for four example pixels (pixel0, pixel1, pixel2, and pixel3) is shown. The bar represents the reflected signal received at the ultrasonic transducer. As shown, the received signals for pixel0, pixel1 and pixel2 all fall within the offset plus/minus the range. For example, the signal received for pixel0 exceeds offset0, but falls within the bounds of range0. Similarly, the signal received for pixel1 and pixel2 each are less than offset1 and offset2, respectively, but still fall within the bounds of range1 and range2, respectively. However, the signal received for pixel3 falls outside of the bounds of range3, indicating that at least that portion of the fingerprint sensor has interacted with an object.

In various embodiments, if it is determined that the signal received for one pixel falls outside of the range, the finger detection mode proceeds to the second phase. In other embodiments, the finger detection mode proceeds to the second phase if the signal received for a certain number of pixels fall outside of the threshold range. For example, the fingerprint sensor may be configured to proceed to the second phase if it is determined that three pixels fall outside of the threshold range. It should be appreciated that the number of pixels having received signals falling outside of the threshold range is configurable, and that any value may be set. It should also be appreciated that other types of stimuli may cause a signal of the fingerprint sensor to fall outside of a threshold. For example, applying a stress to the fingerprint sensor (e.g., bending a phone housing the fingerprint sensor in a back pocket) or thermal shock (e.g., dropping a phone housing the fingerprint sensor in the snow) may cause the signal to exceed the threshold. Even in these examples of different types of stimuli, the finger detection mode would proceed to a second phase, at least for purposes of updating threshold values.

In some embodiments, the first phase of the finger detection is operable to detect whether a human finger has interacted with the fingerprint sensor. For example, the acoustic properties of many materials, such as acrylic, metal, cloth, nylon, etc., have acoustic properties that are significantly different from a human finger that impact the reflection intensity of the ultrasonic signal. By properly determining a threshold, it is possible determine that an object contacting the fingerprint sensor is not a finger, thus rejecting phantom contact made from materials other than human skin.

Figure 22:
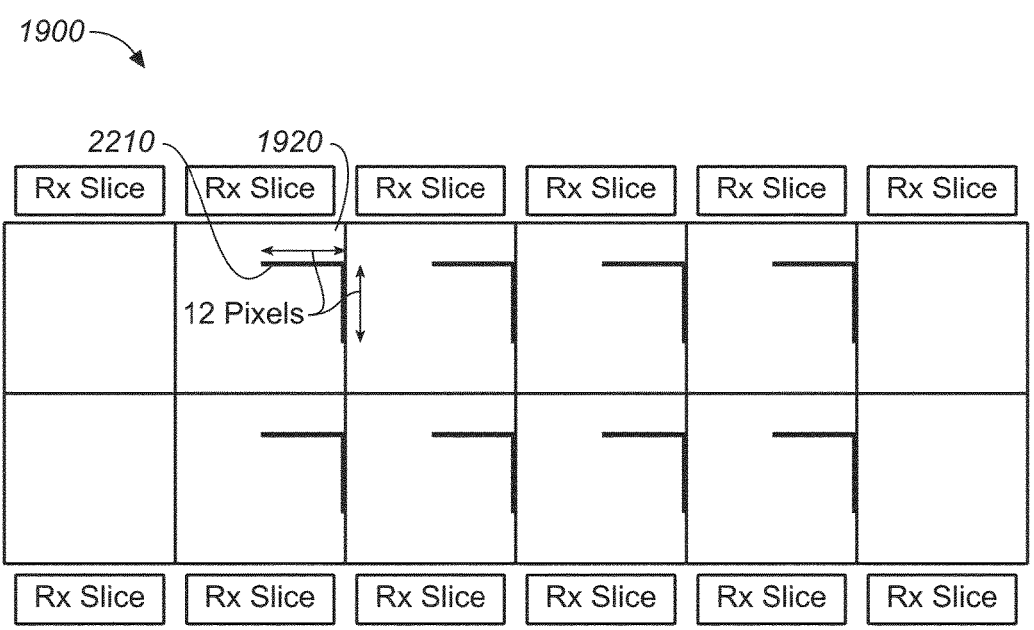
FIG. 22 illustrates example operation in a second phase of a finger detection mode associated with a two-dimensional array of ultrasonic transducers, according to some embodiments.

In certain embodiments described with respect to FIG. 22, the finger detection mode is switched to a second low power mode (e.g., second phase) to determine if the object is a finger. In one embodiment, the second phase has a greater number of captured pixels and an associated power usage greater than the first phase. In other embodiments, the finger detection mode can be switched to a full power, fingerprint sensor mode, to immediately attempt detection of a fingerprint image. Once a fingerprint image is obtained, or if a finger is determined not to be present, the pixel array can be switched back to the always-on first low power mode.

FIG. 22 illustrates example operation in a second phase of a finger detection mode associated with a two-dimensional array 1900 of ultrasonic transducers, according to some embodiments. In one embodiment, the second phase of the finger detection mode includes the activation of a second subset of ultrasonic transducers for capturing multiple pixels (e.g., pixels 2210) within a block (e.g., block 1920) of two-dimensional array 1900. In one embodiment, the multiple pixels may be arranged in orthogonal vectors. For example, two-dimensional array 1900 includes twelve blocks of 24×24 ultrasonic devices. As illustrated, the second phase includes activation of ultrasonic devices of the middle eight 24×24 blocks of ultrasonic transducers for capturing a multiple pixels within each activated block. While the illustrated embodiment shows only eight of the twelve blocks activated, and only ultrasonic transducers activated for capturing particular pixels within the activated blocks, it should be appreciated that any number of blocks may be activated, that the pixels may be located at any position within a block, and any number of ultrasonic transducers may be activated for capturing any number of pixels, and that the illustrated embodiment is an example of many different possibilities. Moreover, it should be appreciated that the two-dimensional array can include any number of ultrasonic transducers, and the two-dimensional array may be divided into any number of independently operable blocks. Furthermore, as described above, embodiments described herein provide for utilizing multiple ultrasonic transducers, some of which may be time-delayed relative to each other, to focus a transmit beam to capture a pixel of an image.

In various embodiments, in the second phase of the finger detection mode, a larger subset of pixels in the two-dimensional array is captured in order to check for the presence of fingerprint characteristics (e.g., ridges and valleys). In some embodiments, because the fingerprint characteristics may be at any angle with respect to the fingerprint array, the active pixels in second phase will span multiple rows and multiple columns of the two-dimensional array. It should be appreciated that, in accordance with various embodiments, the second phase of finger detection mode may include more than one intermediate phase. For example, the second phase may include two successively larger subsets of pixels, wherein the first is for identifying some finger-like features and the second is for identifying a ridge/valley pattern.

In the illustrated embodiment, the captured pixels are arranged in orthogonal vectors. As illustrated, an L-shaped pixel pattern 2210 is shown and includes two orthogonally oriented twelve pixel lines. In another embodiment, the orthogonal vectors are arranged in a cross shaped pixel pattern. In another embodiment, the orthogonal vectors may adapt to different arrangements during the second phase of the finger detestation mode (e.g., rotate a cross shaped pixel pattern about a center pixel, alternate between a cross shaped pixel pattern and an L-shaped pixel pattern. It should be appreciated that other pixel patterns of orthogonal vectors may be used, including both intersecting orthogonal vectors and non-intersecting orthogonal vectors. This illustrated embodiment has sufficient size and orientation to detect a characteristic ridge or valley of a fingerprint regardless of orientation of the finger to the device. Although an L-shaped pixel pattern is illustrated consisting of 23 total pixels, it will be understood that alternative pixel patterns and pixel counts can be used, and multiple pixel patterns can be either grouped together or distributed throughout the array. In this second phase of the finger detection mode, one or more transmit and receive cycles are employed to determine if the object has a reflection intensity consistent with a finger, and specifically whether the reflection intensity along a line is consistent with the characteristic spacing found in fingerprint ridges and valleys. If reflection patterns consistent with a finger are detected, the mode can be switched to turn on substantially all of the ultrasonic transducers of the two-dimensional array to analyze biometric data associated with the human finger, including subdermal layers, vein or artery position, and a fingerprint image. Once a fingerprint image is obtained, or if a finger is determined not to be present, the pixel array can be switched back to the always-on first low power mode. In one embodiment, if a finger is not determined to be present, the offset of the threshold is updated with the most recent received signal value for the pixel.

In accordance with various embodiments, a positioning pixel that is representative of a position of the pixel pattern is used to determine the pixel pattern selection sequence. The positioning pixel of a pixel pattern may be any pixel of the pixel pattern, so long as the selected positioning pixel remains constant within the pixel pattern. In some embodiments, where the pixel pattern includes orthogonal vectors, the intersecting pixel of the vectors may be used as the positioning pixel. For example, the positioning pixel may be the center pixel of a cross shaped pixel pattern or the intersecting pixel of an L-shaped pixel pattern. In other embodiments, the positioning pixel may be the center pixel of a block defined by the orthogonal vectors, and may not be included in the orthogonal vectors (e.g., the positioning pixel need not be imaged).

In some embodiments, consecutive positioning pixels (e.g., from left to right and proceeding to the next lower row of pixels) are selected during the pixel pattern selection sequence. In other embodiments the ordering of selected positioning pixels is performed according a predetermined order. In some embodiments, all pixels within a block/array are selected as a positioning pixel before a pixel pattern selection sequence is completed (e.g., each pixel is selected as a positioning pixel once before a pixel can be selected again). It should be appreciated that any ordering of pixel pattern selection sequence can be used.

In some embodiments, the pixel pattern selection is performed such that the positioning pixel is constrained to a subset of pixels of an array or a block. For example, the positioning pixel may be constrained to pixels within a particular region of a block. In a particular example, consider a 24×24 block of ultrasonic devices (e.g., block 1920 of FIG. 22). In one embodiment, positioning pixel selection is constrained to the middle 16×16 pixels of the block. In the current example, the pixel pattern selection sequence is performed for each pixel of the 16×16 block as positioning pixel (totaling 256 pixels) before the pixel pattern selection sequence is repeated.

Figure 23:
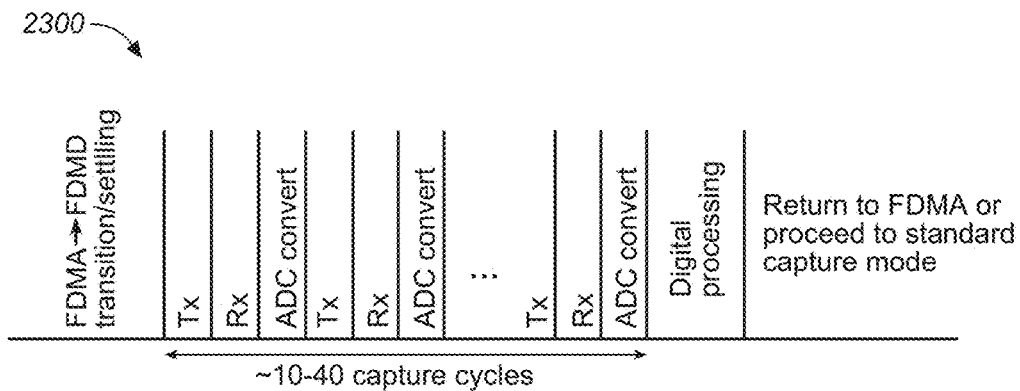
FIG. 23 illustrates an example duty-cycle timeline 2300 for the second phase of the finger detection mode, according to an embodiment.

FIG. 23 illustrates an example duty-cycle timeline 2300 for the second phase of the finger detection mode. The first phase of the finger mode detection (e.g., FDMA) transitions to the second phase of the finger mode detection (e.g., FDMB). As illustrated, capture of reflected ultrasonic waves can require a paired series of transmit (Tx) and receive (Rx) cycles. Between each signal pair, analog to digital conversion (ADC) occurs, and the results are transmitted for further digital processing. This capture cycle can be repeated a number of times (e.g., 10-40 capture cycles).

After pixels of the second phase are captured, the received data is processed to identify characteristics of a fingerprint. In one embodiment, the received data is analyzed to identify if ridge-valley-ridge or valley-ridge-valley patterns exist in the scanned rows and columns. If no patterns exist, the system will return to first phase of the finger detection mode (e.g., FDMA). In this case, the system may update the first phase of the finger detection mode thresholds to avoid entering second phase of the finger detection mode again on the same stimulus. This prevents the system from toggling back and forth between first phase and the second when no finger is present. If a ridge/valley pattern is recognized in the second phase of the finger detection mode, then the system will exit finger detect mode and proceed to a full fingerprint capture.

Figure 24:
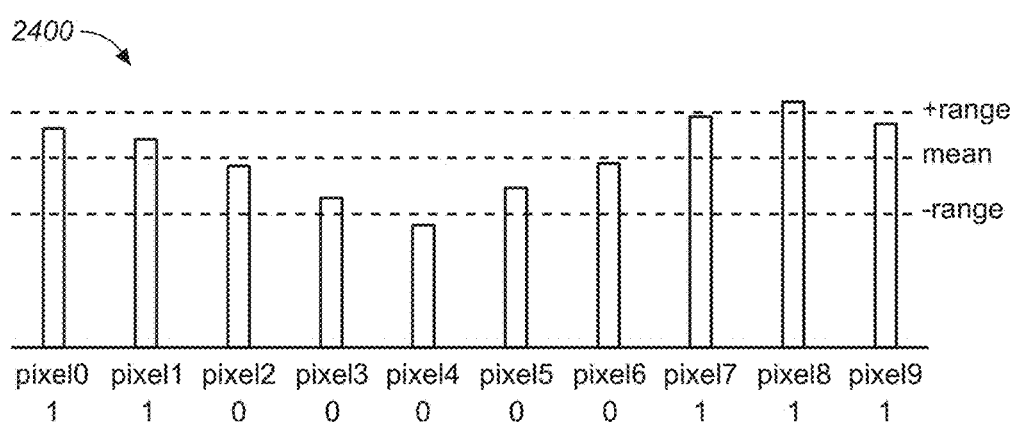
FIG. 24 illustrates an example of thresholding for the second phase of the finger detection mode, in accordance with various embodiments.

In various embodiments, the captured data of the second phase of the finger detection mode is divided into groups of pixels. FIG. 24 illustrates an example of thresholding 2400 for the second phase of the finger detection mode, in accordance with various embodiments. In the example of FIG. 22 there are 16 groups: 8 row groups, and 8 column groups. Each group includes 12 pixels. In one example, detecting ridge-valley patterns within a given group of pixels proceeds as follows:

1. Subtract the mean of the group of pixels
    2. Compare the result to ±range values.
       a. If no pixels are outside of ±range, no ridge/valley pattern is detected. End processing for this group of pixels
       b. Otherwise, proceed to step 3
    3. Truncate each pixel value's value to a single-bit (e.g., '1' if above the mean, '0' if below the mean)
    4. Check for patterns that contain x"00"x"11"x"00"x or x"11"x"00"x"11"x, where 'x' corresponds to an arbitrary number of 0's or 1's (including none),
       a. If neither pattern matches, no ridge/valley patterns are detected in this pixel group
       b. If at least one pattern matches, then ridge/valley patterns are detected This procedure is performed for each pixel group in the second phase of the finger detection mode scan to determine how many of the groups contain ridge/valley patterns. If the number of pixel groups that contain ridge/valley patterns equals or exceeds a target count value 'N', the system will proceed to capture mode. Otherwise, the system may update first phase of the finger detection mode threshold offsets to be equal to the first phase of the finger detection mode scan results and return to first phase of the finger detection mode.

In another embodiment, an exclusive or (XOR) operation is performed on neighboring pixel values to identify characteristics of a fingerprint. In one embodiment, in the second phase of the finger detection mode, an XOR operation is performed for each element and the element next to it to detect whether there is a "ridge-valley" or "valley-ridge" transition (e.g., XOR(1,0)=1, XOR(0,1)=1). For example, where a value of 0 indicates a signal below threshold (ridge)

and a value of 1 indicates a signal above threshold (valley), the following pattern is indicative of two transitions:

0000011111100000

In one embodiment, a "despike" operation is performed. A despike operation removes false indications of ridge-valley spikes that result from noise when the contrast to noise ratio (CNR) is low. For example, the following pattern includes false indications of transitions:

0101000111011100010100

In this example, the first seven values "0101000" and the final eight values "00010100" indicate real ridges and the middle seven values "1110111" indicate a real valley. However, there are random "1s" within the ridges and a random "0" within the valley due to noise. The despike operation removes the random "1s" and random "0s" by making any patterns containing "010" into "000" and containing "101" into "111". After performing the despike operation, the pattern will become:

0000000111111100000000

In various embodiments, within a block, a threshold is set to determine how many blocks pass the test. For example, 4 out of 8 blocks may have more than 2 "XOR=1." The sum of all "XOR=1" will be determined among all blocks (e.g., sum value equals X), which is compared to a global threshold Y to determine whether X is greater than Y. If X is greater than Y, it is determined that characteristics of a fingerprint are identified.

FIGS. 25A-D illustrate another example of thresholding for the second phase of the finger detection mode, in accordance with various embodiments. In various embodiments, orthogonal vectors of pixels are captured for detecting ridges and valleys, indicative of a fingerprint image. In one embodiment, the orthogonal vectors are arranged in a cross shaped pixel pattern. In another embodiment, the orthogonal vectors are arranged in an L-shaped pixel pattern. It should be appreciated that other pixel patterns of orthogonal vectors may be used, including both intersecting orthogonal vectors and non-intersecting orthogonal vectors.

Figure 25A:
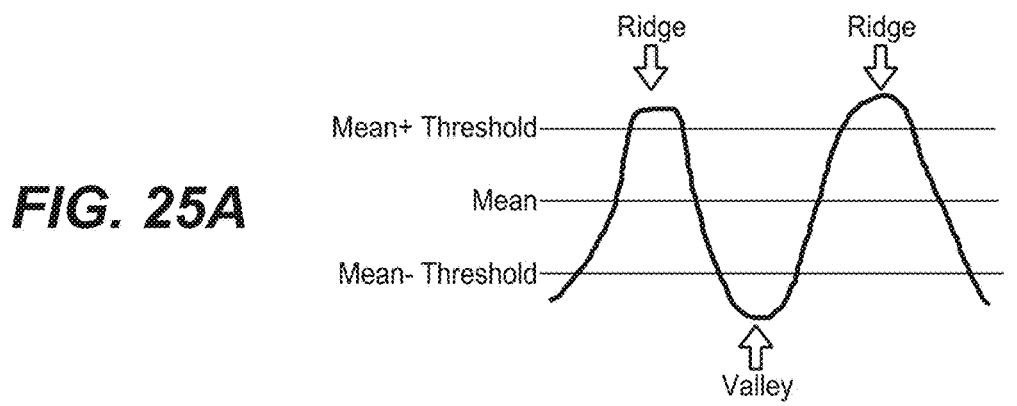
FIGS. 25A-D illustrate another example of thresholding for the second phase of the finger detection mode, in accordance with various embodiments.
Figure 25B:
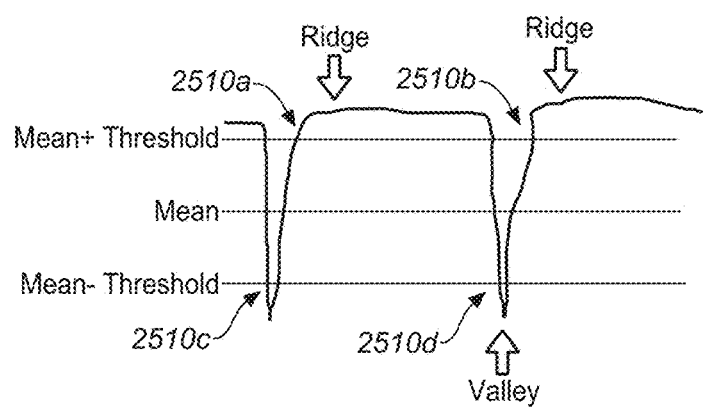
Figure 25C:
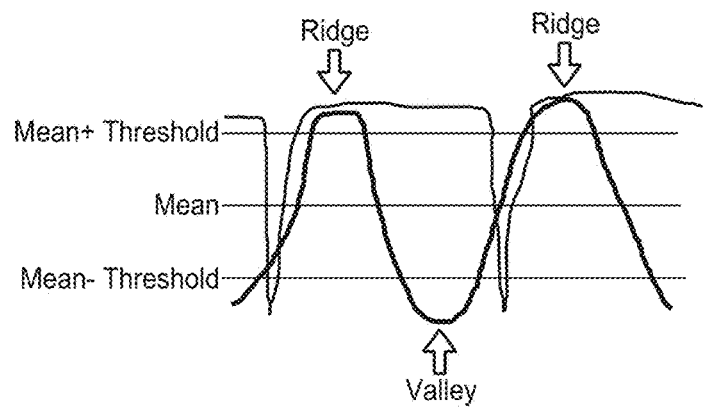

As illustrated in FIG. 25A, ridges and valleys for each orthogonal vector are detected out of the mean intensity level within a threshold range. As illustrated in FIG. 25B, a vertical profile of the finger may appear flattened due to high finger pressure on an array of ultrasonic transducers, where ridges of a finger are compressed. Points 2510a and 2510b indicate where the curve (e.g., the pixel value) exceeds the mean plus threshold value, indicative of a rising edge transition, and points 2510c and 2510d indicate where the curve drops below the mean minus threshold value. In one embodiment, to detect and measure a ridge to ridge size, a period between points 2510a and 2510b is computed. Only if a point under the mean minus threshold is detected between points 2510a and 2510b is a ridge to ridge size determined. As illustrated, point 2510d satisfies this requirement. FIG. 25C illustrates the overlapping curves of FIGS. 25A and 25B.

Figure 25D:
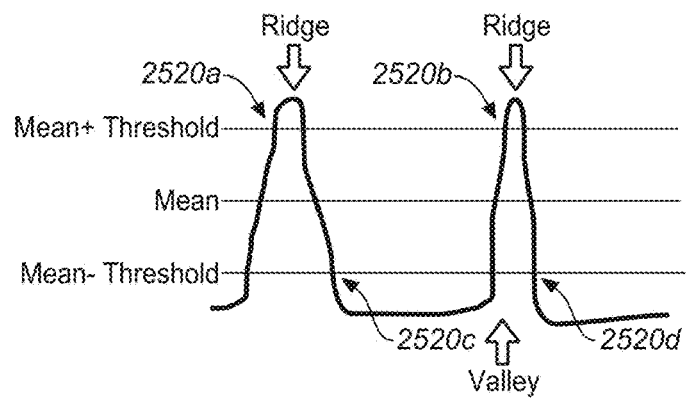

FIG. 25D illustrates an example where a finger is pushed against a fingerprint sensor with low pressure. Points 2520a and 2520b indicate where the curve (e.g., the pixel value) exceeds the mean plus threshold value, indicative of a rising edge transition, and points 2520c and 2520d indicate where the curve drops below the mean minus threshold value. In one embodiment, to detect and measure a ridge to ridge size, a period between points 2520a and 2520b is computed. Only if a point under the mean minus threshold is detected between points 2520a and 2520b is a ridge to ridge size determined. As illustrated, point 2520c satisfies this requirement. FIGS. 25A-25D describe an example thresholding where a pattern indicative of a fingerprint can be detected independent of finger pressure.

Figure 26:
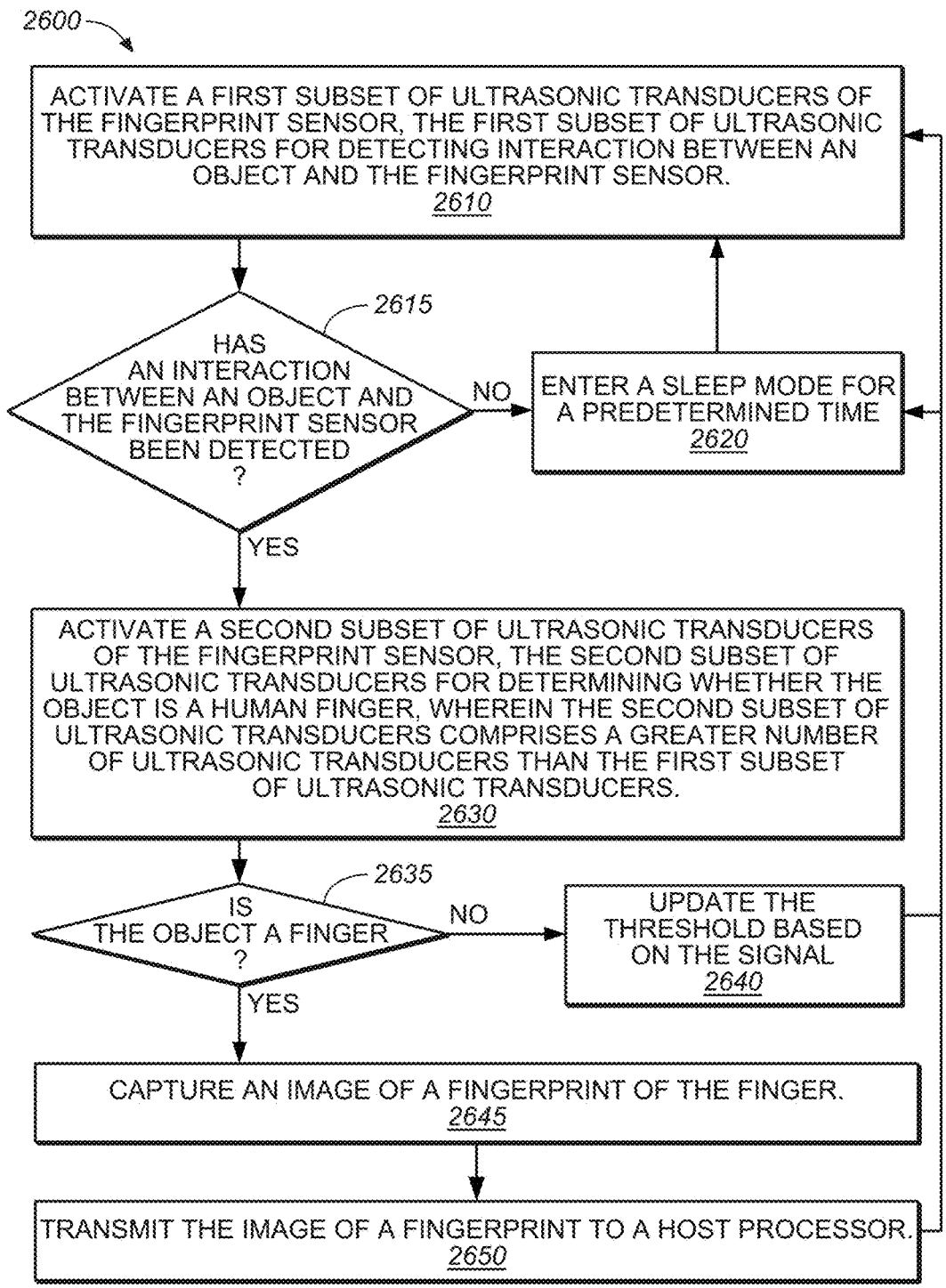
FIGS. 26 through 28 illustrate flow diagrams of example methods for operating a fingerprint sensor comprised of ultrasonic transducers, according to various embodiments.
Figure 27:
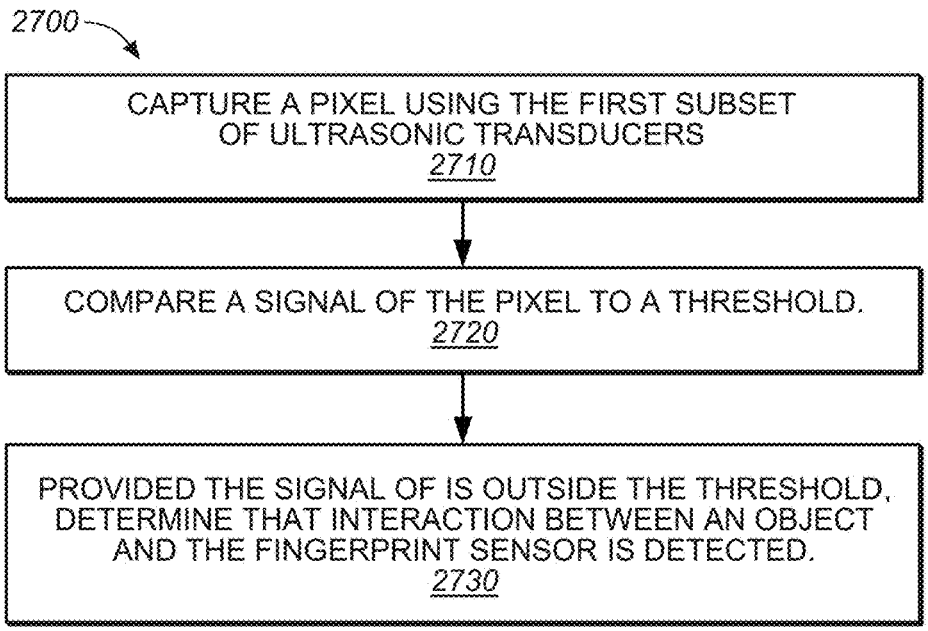
Figure 28:
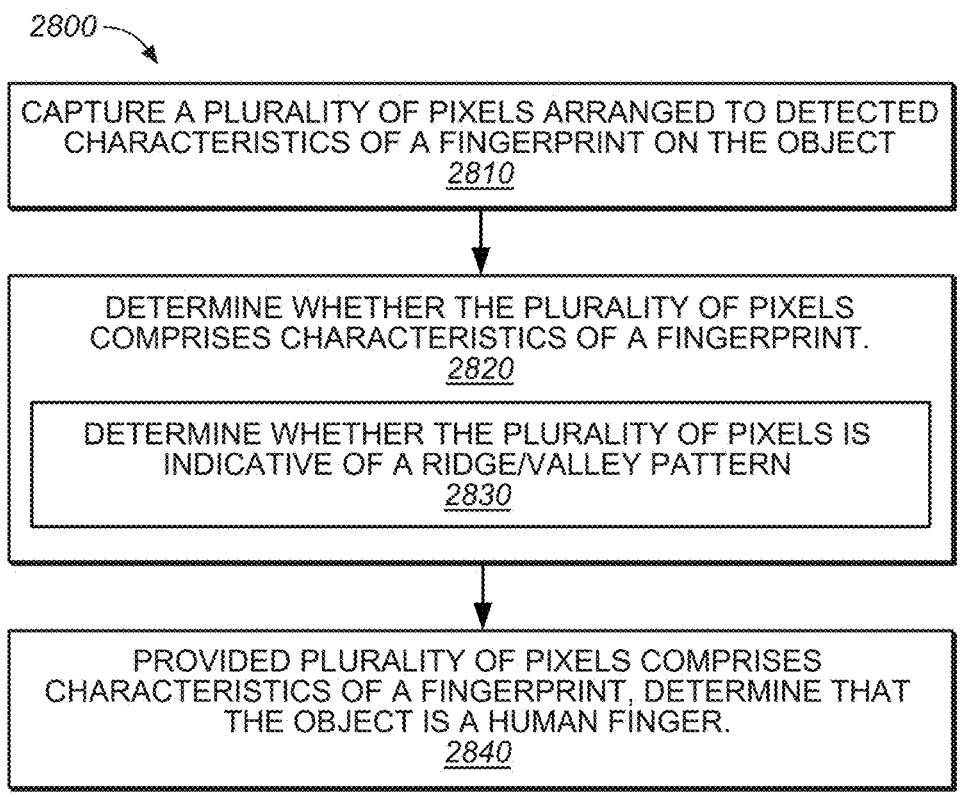

FIGS. 26 through 28 illustrate flow diagrams of example methods for operating a fingerprint sensor comprised of ultrasonic transducers, according to various embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG. 26, at procedure 2610 of flow diagram 2600, a first subset of ultrasonic transducers of the fingerprint sensor (e.g., fingerprint sensor 1815) are activated, where the first subset of ultrasonic transducers is for detecting interaction between an object and the fingerprint sensor. In one embodiment, the ultrasonic transducers are PMUT devices. In one embodiment, procedure 2610 is performed periodically until interaction between an object and the fingerprint sensor is detected.

With reference to FIG. 27, flow diagram 2700 is shown in which an embodiment of procedure 2610 is described. In one embodiment, as shown at procedure 2710, a pixel (e.g., pixel 1910) is captured using the first subset of ultrasonic transducers. In one embodiment, where the plurality of ultrasonic transducers is arranged into a plurality of blocks, a pixel for at least two blocks (e.g., block 1920) of the plurality of blocks is captured. At procedure 2720, a signal of the pixel is compared to a threshold. In one embodiment, the threshold includes an offset and a range. At procedure 2730, provided the signal is outside the threshold, it is determined that interaction between an object and the fingerprint sensor is detected.

With reference to FIG. 26, at procedure 2615, it is determined whether an interaction between an object and the fingerprint sensor has been detected. Provided an interaction between an object and the fingerprint sensor is not detected, in accordance with one embodiment, flow diagram 2600 proceeds to procedure 2620. At procedure 2620, the fingerprint sensor enters a sleep mode for a predetermined time (e.g., 10 to 20 ms). After the predetermined time, flow diagram 2600 proceeds to procedure 2610.

With reference to procedure 2615, subsequent an interaction between an object and the fingerprint sensor being detected, flow diagram 2600 proceeds to procedure 2630. At procedure 2630, a second subset of ultrasonic transducers of the fingerprint sensor, where the second subset of ultrasonic transducers is for determining whether the object is a human finger, wherein the second subset of ultrasonic transducers comprises a greater number of ultrasonic transducers than the first subset of ultrasonic transducers.

With reference to FIG. 28, flow diagram 2800 is shown in which an embodiment of procedure 2630 is described. In one embodiment, as shown at procedure 2810, a plurality of pixels (e.g., pixels 2210) arranged to detect characteristics of a fingerprint on the object is captured. In one embodiment, the plurality of pixels is arranged in orthogonal vectors. In one embodiment, the orthogonal vectors are arranged in an L-shaped pixel pattern. In another embodiment, the orthogonal vectors are arranged in a cross shaped pixel pattern. In another embodiment, the orthogonal vectors may adapt to different arrangements during the second phase of the finger detestation mode (e.g., rotate a cross shaped pixel pattern about a center pixel, alternate between a cross shaped pixel pattern and an L-shaped pixel pattern. It should be appreciated that other pixel patterns of orthogonal vectors may be used, including both intersecting orthogonal vectors and non-intersecting orthogonal vectors. In one embodiment, where the plurality of ultrasonic transducers is arranged into a plurality of blocks, orthogonal vectors of pixels for at one block of the plurality of blocks are captured. At procedure 2820, it is determined whether the plurality of pixels comprises characteristics of a fingerprint. In one embodiment, as shown at procedure 2830, it is determined whether the plurality of pixels is indicative of a ridge/valley pattern. At procedure 2840, provided the plurality of pixels comprises characteristics of a fingerprint, it is determined that the object is a human finger.

With reference to FIG. 26, at procedure 2635, it is determined whether the object is a finger. Provided the object is not a finger, in accordance with one embodiment, flow diagram 2600 proceeds to procedure 2640. At procedure 2640, the threshold is updated based on the signal. In one embodiment, the offset of the threshold is updated. In one embodiment, flow diagram 2600 then proceeds to procedure 2620. In another embodiment, flow diagram 2600 then proceeds to procedure 2610.

In one embodiment, provided the object is determined to be a finger, flow diagram 2600 proceeds to procedure 2645. At procedure 2645, an image of a fingerprint of the finger is captured. In one embodiment, as shown at procedure 2650, the image of the fingerprint is transmitted to a host processor. In one embodiment, flow diagram 2600 then proceeds to procedure 2620. In another embodiment, flow diagram 2600 then proceeds to procedure 2610.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method for operating a fingerprint sensor comprising a plurality of ultrasonic transducers, the method comprising:
    activating a first subset of ultrasonic transducers of the fingerprint sensor, the first subset of ultrasonic transducers for detecting interaction between an object and the fingerprint sensor; and
    subsequent to detecting interaction between an object and the fingerprint sensor, activating a second subset of ultrasonic transducers of the fingerprint sensor, the second subset of ultrasonic transducers for determining whether the object is a human finger, wherein the second subset of ultrasonic transducers comprises a greater number of ultrasonic transducers than the first subset of ultrasonic transducers.

2. The method of claim 1, further comprising:
    responsive to determining that the object is a human finger, capturing an image of a fingerprint of the finger.

3. The method of claim 2 further comprising:
    transmitting the image of the fingerprint to a host processor.

4. The method of claim 3 further comprising:
    responsive to transmitting the image of the fingerprint to the host processor, entering a sleep mode for a predetermined period; and
    after the predetermined period, performing the activating the first subset of ultrasonic transducers of the fingerprint sensor.

5. The method of claim 1, wherein the ultrasonic transducers are Piezoelectric Micromachined Ultrasonic Transducer (PMUT) devices.

6. The method of claim 1, further comprising:
    responsive to not detecting interaction between an object and the fingerprint sensor, entering a sleep mode for a predetermined period; and after the predetermined period, performing the activating the first subset of ultrasonic transducers of the fingerprint sensor.

7. The method of claim 6, wherein the activating a first subset of ultrasonic transducers of the fingerprint sensor is performed periodically until interaction between an object and the fingerprint sensor is detected.

8. The method of claim 1, wherein the activating the first subset of ultrasonic transducers of the fingerprint sensor comprises:
  capturing a pixel using the first subset of ultrasonic transducers;
  comparing a signal of the pixel to a threshold; and
  provided the signal is outside the threshold, determining that interaction between an object and the fingerprint sensor is detected.

9. The method of claim 8, wherein the plurality of ultrasonic transducers is arranged into a plurality of blocks, and wherein the capturing a pixel using the first subset of ultrasonic transducers comprises:
  capturing a pixel for at least two blocks of the plurality of blocks.

10. The method of claim 8, wherein the threshold comprises an offset and a range.

11. The method of claim 10, further comprising:
  responsive to determining that the object is not a human finger, updating the offset of the threshold with the signal.

12. The method of claim 1, wherein the activating the second subset of ultrasonic transducers of the fingerprint sensor comprises:
  capturing a plurality of pixels arranged to detect characteristics of a fingerprint on the object;
  determining whether the plurality of pixels comprises characteristics of a fingerprint; and
  provided the plurality of pixels comprises characteristics of a fingerprint, determining that the object is a human finger.

13. The method of claim 12, wherein the plurality of pixels are arranged in orthogonal vectors.

14. The method of claim 12, wherein the plurality of ultrasonic transducers is arranged into a plurality of blocks, and wherein the capturing the plurality of pixels arranged to detect characteristics of a fingerprint on the object comprises:
  capturing orthogonal vectors of pixels for at least one block of the plurality of blocks.

15. The method of claim 12, wherein the determining whether the plurality of pixels comprises characteristics of a fingerprint comprises:
  determining whether the plurality of pixels is indicative of ridge/valley pattern.

16. A non-transitory computer-readable storage medium comprising instructions which when executed on one or more data processors, cause the one or more data processors to perform a method for operating a fingerprint sensor comprising a plurality of ultrasonic transducers, the method comprising:
  activating a first subset of ultrasonic transducers of the fingerprint sensor, the first subset of ultrasonic transducers for detecting interaction between an object and the fingerprint sensor;
  subsequent to detecting interaction between an object and the fingerprint sensor, activating a second subset of ultrasonic transducers of the fingerprint sensor, the second subset of ultrasonic transducers for determining whether the object is a human finger, wherein the second subset of ultrasonic transducers comprises a greater number of ultrasonic transducers than the first subset of ultrasonic transducers.

17. The non-transitory computer-readable storage medium of claim 16, the method further comprising:
  responsive to determining that the object is a human finger, capturing an image of a fingerprint of the finger.

18. The non-transitory computer-readable storage medium of claim 16, the method further comprising:
  responsive to transmitting the image of the fingerprint to a host processor, entering a sleep mode for a predetermined period; and
  after the predetermined period, performing the activating the first subset of ultrasonic transducers of the fingerprint sensor.

19. The non-transitory computer-readable storage medium of claim 16, the method further comprising:
  responsive to not detecting interaction between an object and the fingerprint sensor, entering a sleep mode for a predetermined period; and
  after the predetermined period, performing the activating the first subset of ultrasonic transducers of the fingerprint sensor.

20. The non-transitory computer-readable storage medium of claim 16, wherein the activating the first subset of ultrasonic transducers of the fingerprint sensor comprises:
  capturing a pixel using the first subset of ultrasonic transducers;
  comparing a signal of the pixel to a threshold; and
  provided the signal is outside the threshold, determining that interaction between an object and the fingerprint sensor is detected.

21. The non-transitory computer-readable storage medium of claim 20, the method further comprising:
  responsive to determining that the object is not a human finger, updating the threshold based on the signal.

22. The non-transitory computer-readable storage medium of claim 16, wherein the activating the second subset of ultrasonic transducers of the fingerprint sensor comprises:
  capturing a plurality of pixels arranged to detect characteristics of a fingerprint on the object, wherein the plurality of pixels are arranged in orthogonal vectors;
  determining whether the plurality of pixels comprises characteristics of a fingerprint; and
  provided the plurality of pixels comprises characteristics of a fingerprint, determining that the object is a human finger.

23. A fingerprint sensor comprising:
  a plurality of ultrasonic transducers;
  a memory; and
  a processor coupled to the memory and the plurality of ultrasonic transducers, the processor configured to:
    activate a first subset of ultrasonic transducers of the plurality of ultrasonic transducers, the first subset of ultrasonic transducers for detecting interaction between an object and the fingerprint sensor;
    subsequent to detecting interaction between an object and the fingerprint sensor, activate a second subset of ultrasonic transducers of the plurality of ultrasonic transducers of the fingerprint sensor, the second subset of ultrasonic transducers for determining whether the object is a human finger, wherein the second subset of ultrasonic transducers comprises a greater number of ultrasonic transducers than the first subset of ultrasonic transducers; and
    responsive to determining that the object is a human finger, capture an image of a fingerprint of the finger.

* * * * *